(12) United States Patent
Mukasa et al.

(10) Patent No.: US 9,333,422 B2
(45) Date of Patent: May 10, 2016

(54) MOTION DETERMINATION APPARATUS, GAME APPARATUS THEREFOR, AND COMPUTER PROGRAM THEREFOR

(71) Applicant: Konami Digital Entertainment Co., Ltd., Tokyo (JP)

(72) Inventors: Shigehito Mukasa, Tokyo (JP); Satoshi Ueda, Tokyo (JP); Takashi Muto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 715 days.

(21) Appl. No.: 13/713,291

(22) Filed: Dec. 13, 2012

(65) Prior Publication Data

US 2013/0102388 A1    Apr. 25, 2013

Related U.S. Application Data

(62) Division of application No. 12/676,389, filed as application No. PCT/JP2008/066059 on Sep. 5, 2008, now Pat. No. 8,357,043.

(30) Foreign Application Priority Data

Sep. 7, 2007    (JP) .................. 2007-233406

(51) Int. Cl.
    *A63F 9/24*    (2006.01)
    *A63F 13/00*    (2014.01)
    (Continued)

(52) U.S. Cl.
    CPC .................. *A63F 13/06* (2013.01); *A63F 13/00* (2013.01); *A63F 13/211* (2014.09);
    (Continued)

(58) Field of Classification Search
    USPC .......................................... 463/37
    See application file for complete search history.

(56) References Cited

U.S. PATENT DOCUMENTS 5,616,078 A    4/1997 Oh
5,643,087 A    7/1997 Marcus et al.
(Continued)

FOREIGN PATENT DOCUMENTS

CN    1520913 A    8/2004
JP    7-185131 A    7/1995
(Continued)

OTHER PUBLICATIONS

International Search Report mailed Oct. 7, 2008 in International Application No. PCT/JP2008/06605p.
(Continued)

*Primary Examiner* — Omkar Deodhar
*Assistant Examiner* — Wei Lee
(74) *Attorney, Agent, or Firm* — Sughrue Mion, PLLC

(57) ABSTRACT

The game apparatus (1) has a fixed main unit (100) and a movable operating device (8) that is held by a player and is capable of detecting the body motion of the player and of transmitting a signal to, receiving from, the main unit (100). The operating device (8) has an acceleration sensor (86) for detecting acceleration, a light source (85), and a transmitter (87) for transmitting a value detected by the acceleration sensor (86) to the main unit (100). The main unit (100) has light receiving units (9L,9R) that receive the light emitted from the light source (85) to detect the intensity of the received light, a RAM (14), and a processor (16). Processor (16) repeats a process of detecting the position of the operating device (8) based on the intensity of light detected by each of the light receiving units (9L,9R), causes a RAM (14) to store the detected position history, determines whether a player has performed a predetermined motion based on the position history and the detected value of the acceleration sensor (86).

10 Claims, 13 Drawing Sheets

(51) Int. Cl.
*G06F 17/00* (2006.01)
*G06F 19/00* (2011.01)
*A63F 13/20* (2014.01)
*A63F 13/211* (2014.01)
*G06F 3/03* (2006.01)
*G06F 3/0346* (2013.01)

(52) U.S. Cl.
CPC ........... *G06F 3/0325* (2013.01); *G06F 3/0346* (2013.01); *A63F 2300/105* (2013.01); *A63F 2300/1087* (2013.01); *A63F 2300/8029* (2013.01); *A63F 2300/8088* (2013.01)

(56) References Cited

U.S. PATENT DOCUMENTS

| | | | |
|---|---|---|---|
| 6,004,134 A | 12/1999 | Marcus et al. | |
| 6,020,893 A | 2/2000 | Freeman | |
| 6,179,619 B1 | 1/2001 | Tanaka | |
| 6,270,403 B1 | 8/2001 | Watanabe et al. | |
| 7,833,098 B2 | 11/2010 | Ohta | |
| 2002/0065121 A1* | 5/2002 | Fukunaga et al. | 463/8 |
| 2004/0009798 A1* | 1/2004 | Okuda et al. | 463/7 |
| 2005/0272506 A1 | 12/2005 | Sumi | |

FOREIGN PATENT DOCUMENTS

| | | |
|---|---|---|
| JP | 2552427 B | 8/1996 |
| JP | 2002-153673 A | 5/2002 |
| JP | 2004-41525 A | 2/2004 |
| JP | 2005-287801 A | 10/2005 |
| JP | 2006-320706 A | 11/2006 |

OTHER PUBLICATIONS

Taiwanese Office Action mailed Oct. 2011 in Taiwanese Patent Application No. 097134184 and translation thereof.
International Search Report mailed Oct. 7, 2008 in International Application No. PCT/JP2008/066059.

* cited by examiner

1

MOTION DETERMINATION APPARATUS, GAME APPARATUS THEREFOR, AND COMPUTER PROGRAM THEREFOR

CROSS-REFERENCE TO RELATED APPLICATIONS

This is a divisional of pending U.S. application Ser. No. 12/676,389 filed Mar. 4, 2010, which is the National Stage Entry of PCT/JP2008/066059, filed on Sep. 5, 2008, which claims priority from Japanese Patent Application No. 2007-233406 filed in Japan on Sep. 7, 2007. The entire disclosures of each of which are incorporated herein in their entirety by express reference thereto.

TECHNICAL FIELD

The present invention relates to a technique for performing a process corresponding to a motion of an operator.

BACKGROUND ART

Japanese Patent No. 2552427 (Japanese Patent Application Laid-Open Publication No. H07-185131) discloses a game apparatus at which a player operates a character so as to have the character play boxing. In the game apparatus, an image of a player, to which a marker (LED (light-emitting diode)) has been attached, is taken by a fixed camera (CCD (charge-coupled device)), and the position of the marker is detected from the taken image. The movement of a player character is then controlled as if a portion corresponding to a portion (a player's portion) at which the marker is attached is, in an imaginary space, at a position within the imaginary space corresponding to the detected position, with the position of the marker having been detected.

In the above game apparatus, the movement of a player character can be adjusted to match the player's motion to some extent if the detecting cycle of a position is shortened and the accuracy in detecting positions is enhanced. However, it is a position, not a player's motion, that is detected by the above game apparatus, and it will not be possible to sufficiently reduce the possibility of not performing a process corresponding to a player's motion even if the detecting cycle of a position is shortened to the extent possible or the accuracy in detecting positions is enhanced to the extent possible. For example, the motion of a character when a player performs a punching motion sometimes does not appear to be a punching motion. In this case, a player will have a feeling of strangeness of the motion of the character. This problem may occur not only at a game apparatus but also at a freely selected apparatus at which, in a case in which an operator performs a predetermined motion, a process corresponding to the motion should be performed.

Accordingly, in a freely-selected apparatus at which, in a case in which an operator performs a predetermined motion, a process corresponding to the motion should be performed, the present invention sufficiently reduces the possibility of a process corresponding to a motion not being performed even though the operator performed the motion, by determining whether the operator has performed the motion.

DISCLOSURE OF INVENTION

Description will first be given of terms used in this specification.

A "game" is an activity involving some rules for determining a result of a play (game play). The "game" includes a multiple-player game in which two or more participant players or two or more participant teams compete or cooperate and a single-player game in which a participant player plays a game to achieve an object or for enjoyment, i.e., a one-person game, and a puzzle. In this description, a multiple-player type game is disclosed as an example of a game. However, the present invention is not limited to a multiple-player type game but includes any other type of game. Examples of a multiple-player type game includes an individual-evaluation type game in which a result of each play is determined for each participant player of the play, and a team-evaluation type game in which a result of each play is determined for each participant team being a group of participant players of this play. Furthermore, as a multiple-player game, a competition type game may be mentioned in which, in each play, participant players of this play or participant teams of the play compete with one another, or a cooperation type game in which participant players or participant teams cooperate with one another. A competition type game includes a match-up game in which participant players or participant teams go against one another.

A "play" of a game is a single act of a player playing a game. Therefore, in a single game, plural plays can be repeated by the same player, and plural plays may be performed simultaneously by plural players. A period of one play is called a "game period". The game period can be fixed or variable, depending on the game. A game proceeds in the game period. A person who can perform each play is called a "player" of the play or game. Therefore, even if a person has not played a game in the past or is not currently playing a game, a person who potentially plays a game is sometimes called a player. However, a player who is actually playing a game and has played a game, in particular, is called a "participant player (participating player)" of the play. "Participation" means to play either in a single player type game or a multiple player type game. In each play, a "result" of the play is an evaluation which a participant player of the play has as an object. Examples of a result of a play include win or loss, a rank, and a score.

A "computer game" is a game for which a play is carried out by a computer. A computer used for carrying out a computer game is called a "game apparatus". The game apparatus may be capable of advancing only one computer game or may be capable of advancing plural computer games.

A place at which a game apparatus is installed is called a "game place". Examples of a game place include a facility at which visitors use the installed game apparatus by paying a fee (for example, a game arcade) and a residential household at which a game apparatus is installed. In the former, a visitor in most cases will be a user of a game apparatus and will be a player of a computer game; and in the latter, a resident in most cases will be a user of a game apparatus and will be a player of a computer game In the former, a game apparatus that has a function of collecting fees from its user (for example, a type of business-use game machine) is installed in most cases; and in the latter, a game apparatus that does not have a function of collecting fees from its user (for example, a type of household use game machine) is installed in most cases.

A "computer" is, from among apparatuses for processing data, one that has a memory for storing data and a processor for executing a computer program stored in the memory. "Data" represents information in a form that is recognizable by a machine such as a computer. Examples of data include data electronically representing information, data magnetically representing information, and data optically representing information. "Information" is an object to be processed which can be represented by data. The "memory" is a device that readably stores data written therein. Examples of the memory include a semiconductor memory, a magnetic memory, and an optical memory. A "computer program" is, from among collections of data representing instructions, a collection designating the procedure of a process. Examples of a computer program include a computer program for causing a computer to advance a computer game when the program is run by the computer. A "processor" is a generic term for an apparatus which is equipped with an instruction set and which executes a computer program by performing a process of executing instructions represented by data included in the computer program in accordance with a procedure indicated by the computer program. Examples of a processor include a single CPU (Central Processing Unit) and a collection of plural CPUs.

Examples of a computer include a computer provided with an interface with the outside. Examples of an interface with the outside include: an input unit for receiving inputted information or data from the outside and an output unit for outputting information or data to the outside. "To input" information is to generate data representing information of the outside by detection or by measurement. Examples of the input unit include a sensor, a button, and a keyboard. "To output" information is to represent information represented by data in such a way that information can be perceived by a human. Examples of ways in which information can be perceived by a human include by light, by sound, and by vibration. Examples of outputting information by light include displaying images and blinking of lights. Examples of outputting information by sound include emitting sounds by a speaker and driving a sound structure by solenoid (for example, ringing a bell). Examples of outputting information by vibration include oscillation by an oscillator.

Description will next be given of the present invention.

The present invention provides a motion determination apparatus that has a fixed main unit; and a movable operating device, held by an operator, that detects body motions of the operator and for transmitting signals to, and receiving from, the main unit, and the operating device has: an acceleration sensor that detects acceleration; a light emitter that emits light; a transmitter that transmits a value detected by the acceleration sensor to the main unit, and light receivers arranged at at least two positions, each receiving light emitted from the light emitter and detecting the strength of the received light; a position detector that performs a process of detecting a position of the operating device based on the intensity of the received light detected by each of the light receivers; a storage device that stores the history of positions of the operating device detected by the position detector; and a motion determiner that determines whether the operator has performed a predetermined motion on the basis of the history of the positions of the operating device and the detected value of the acceleration sensor.

According to this motion determination apparatus, it is possible to determine whether an operator has performed a predetermined motion based on the acceleration of an operating device (the detected value of the acceleration sensor) and position history. Therefore, according to the present invention, in an apparatus that, in a case in which an operator performs a predetermined motion, should perform a process corresponding to the motion, because the apparatus is capable of determining whether the operator has performed the motion, the possibility can be sufficiently reduced of a process corresponding to the motion not being performed even though the operator has performed the motion. The position history which is the basis for the determination by the motion determiner means all or some of positions stored in the storage device. This position history is obtained by repeatedly performing a process of detecting the position of the operating device based on the intensity of light detected by the light receiver. "Repeatedly performing a process of detecting the position of the operating device" includes not only performing this process at regular time interval, but also performing this process at time interval that is not regular.

More specifically, acceleration that is produced when a predetermined motion is performed and information (for example, moving distance) obtained from positions are stored in a memory as motion patterns, and actually detected acceleration and information obtained from the positions are compared to determine whether a predetermined motion has been performed. As a result, it becomes possible to distinguish, for example, a motion that swings the operating device quickly and with a little swing (large acceleration and small moving distance) and a motion that swings operating device slowly and with a large swing (small acceleration and large moving distance).

Furthermore, the motion determiner, when acceleration of equal to or greater than the predetermined standard value is detected by the acceleration sensor, may be triggered by this detection, to determine whether an operator has performed a predetermined motion by referring to the position history detected by the position detector. In this mode, because the motion determination is performed only when an operator moves the operating device with acceleration that is equal to or greater than the standard value, the motion determination does not have to always be performed. Therefore, the processing burden can be reduced. In addition, that an operator's arm has been moved with acceleration of equal to or greater than the standard value can be used as one of conditions of a predetermined motion. An operator's arm moves slightly even if the operator is conscious of keeping the arm from moving. In a case in which a certain instruction is input depending on a predetermined motion, a subtle motion needs be eliminated since it does not reflect the operator's intent. In this mode, because the detection of acceleration of equal to or greater than the standard value can be made one of the conditions for a predetermined motion, an instruction can be input accurately.

In the above motion determination apparatus, the motion determiner may determine whether an extension and retraction motion of the operator has been performed based on the relationship between a first determination distance of a first position detected by the position detector and a second determination distance of a second position immediately previously detected by the position detector, the determination distance being a distance between an origin and a position detected by the position detector after the origin was detected, with the origin being a point of a position detected by the position detector immediately before acceleration of equal to or greater than a predetermined standard value is detected by the acceleration sensor. "The extension and retraction motion of an operator" is an extension and retraction motion of an operator's body (for example, an arm or a leg). Acceleration detected in the extension and retraction motion of an operator usually becomes large when the retraction starts after the extension is completed, or when the extension starts when the retraction is completed. Also, given that a point of a position of an operating device detected immediately before a large acceleration is detected, the distance between the subsequent position of the operating device and the origin monotonically increases or decreases during a period in which a motion (extension motion or retraction motion) that was started when the acceleration was detected is ongoing, and, when the motion is completed, the distance changes in the reverse direction. In these regards, in the motion determination apparatus in this mode, because it is determined whether the extension and retraction motion of an operator has been performed from the relationship between the distances of the operating device from the origin at two time points after the origin was detected, with the origin being a point of a position detected immediately before acceleration of equal to or greater than a predetermined standard value was detected, it is possible to determine with great accuracy whether an extension and retraction motion of an operator involving acceleration of equal to or greater than a certain degree has been performed.

Furthermore, in the motion determination apparatus of this mode, the motion determiner may determine that an extension and retraction motion of an operator has been performed when the first determination distance with respect to the first position is smaller than the second determination distance with respect to the second position, and when the second determination distance with respect to the second position is equal to or greater than a predetermined standard distance. In the motion determination apparatus of this mode, by determining a standard distance depending on an extension and retraction motion to be detected, the accuracy of detecting a motion to be detected can be enhanced. For example, in a case in which an extension and retraction motion to be detected is an extension and retraction motion in which an operator grasping or wearing the operating device in one hand fully extends and retracts an arm leading from the hand (for example, a punch in boxing), the standard distance is set at an appropriate value, a situation is avoided of erroneously detecting a motion in which the extension of the arm is not full (for example, a guard in boxing) as a motion to be detected.

In this mode, the motion determination apparatus may further have a direction calculator that calculates a direction of a straight line passing through the origin and the second position in a case in which it is determined by the motion determiner that an extension and retraction motion of the operator has been performed. In the motion determination apparatus of this mode, the direction calculated by the determination calculator, because it is the direction of a straight line passing through the origin and a position (second position) that is the most distant from the origin in the extension and retraction motion, will be appropriate as the direction of the extension and retraction in the performed extension and retraction motion. When the direction of the extension and retraction in the extension and retraction motion is known, a process performed depending on this direction can be varied.

In the above motion determination apparatus, there may be a plurality of the operating devices, and the light emitter of each of the operating devices may emit light during a period in which the light emitter of any other operating device of the operating devices is not emitting light. According to this mode, even if plural operating devices are used, the light emission by the light emitter does not overlap timewise among the operating devices. Therefore, it is possible to correctly detect the position of each operating device, to determine whether a predetermined motion was performed.

In the above motion determination apparatus, the frequency of light emitted by the light emitter may be set to a frequency that does not interfere with external light. According to this mode, the accuracy in detecting the position of the operating device can be enhanced.

Furthermore, the present invention provides a game apparatus that has: the above motion determination apparatus; a display unit connected to the main unit; and a game executor that is provided with the main unit and for conducting a game by using the display unit, and the game executor may execute a predetermined instruction in a case in which it is determined by the motion determiner that a predetermined motion has been performed. According to this game apparatus, because a predetermined instruction is executed when it is determined that a predetermined motion has been performed, the possibility can be reduced of the instruction not being executed even though the player has performed the motion. The "predetermined instruction" is an instruction (command) in advancing a game, and includes, for example, an instruction for causing a character to perform a hitting motion (a punch) in a game in which a player (operator) operates the character displayed on a display unit. In the game of this example, in a case in which a player performs a predetermined motion, it is determined that this motion has been performed, and the motion of a character displayed on the display unit will be in accordance with a predetermined instruction. Therefore, the possibility will be sufficiently reduced of a player feeling a sense of strangeness about the motion of a character.

In the above game apparatus, the operating device may be held by or be worn on a hand of the operator, and the motion determiner may determine that the extension and retraction motion is a hitting motion; the operating device may be attached to a leg of the operator, and the motion determiner may determine that the extension and retraction motion is a kicking motion; or the operating device may be attached to the upper torso of the operator other than the hands, and the motion determiner may determine that the extension and retraction motion is a bending and stretching motion. Examples of the "bending and stretching" include a motion that bends and stretches the knees.

In the above game apparatus, the motion determiner may determine whether an extension and retraction motion of the operator has been performed based on the relationship between a first determination distance of a first position detected by the position detector and a second determination distance of a second position immediately previously detected by the position detector, the determination distance being a distance between an origin and a position detected by the position detector after the origin was detected, with the origin being a point of a position detected by the position detector immediately before acceleration of equal to or greater than a predetermined standard value is detected by the acceleration sensor, and the game apparatus may further have a type identifier that, in a case in which it is determined that an extension and retraction motion of the operator has been performed, identifies a type of the extension and retraction motion of the operator based on the history of the positions of the operating device. According to the game apparatus of this mode, the type of the extension and retraction motion can be identified. Therefore, a process according to the identified type can be performed.

In this mode of the game apparatus, the type identifier may identify the type of the extension and retraction motion of the operator based on a direction of the extension and retraction motion and a predetermined range of the direction, the direction being assumed as corresponding to a direction of a straight line passing through a destination point and the origin, with the destination point being the position that is the most distant from the origin. As another method for identifying a type of the extension and retraction motion based on the position history, there is a method of identifying a type of the extension and retraction motion by a pattern matching to the position history, but this method requires a large amount of pattern data. Conversely, in the game apparatus of this mode, a type of extension and retraction motion can be identified without preparing such pattern data. Furthermore, in the game apparatus of this mode, there is an advantage that there will be no case in which a type of the extension and retraction motion cannot be identified.

Furthermore, the present invention provides a computer program and a computer-readable recording medium that has stored this computer program thereon, the computer program for use in a motion determination apparatus provided with a fixed main unit; and a movable operating device, held by an operator, that detects motions of a body of the operator and for transmitting and receiving signals to and from the main unit, the operating device having: an acceleration sensor that detects acceleration; a light emitter that emits light; and a transmitter that transmits a value detected by the acceleration sensor to the main unit, and the main unit having: light receivers arranged at at least two positions, each receiving light emitted from the light emitter and detecting the strength of the received light, the computer program causing the main unit to function as: a position detector that performs a process of detecting a position of the operating device based on the intensity of the received light detected by each of the light receivers; a storage device that stores history of positions of the operating device detected by the position detector; and a motion determiner that determines whether the operator has performed a predetermined motion on the basis of the history of the positions of the operating device and the detected value of the acceleration sensor.

A motion determination apparatus that executes this computer program is a freely-selected apparatus which, in a case in which an operator performs a predetermined motion, should perform a process corresponding to the motion, and because the apparatus is capable of determining whether the operator has performed the motion, the possibility can be sufficiently reduced of a process corresponding to the motion not being performed even though the operator has performed the motion. It is to be noted that a data carrier may be provided instead of a recording medium.

Effects of the Invention

According to the present invention, in a freely-selected apparatus which, in a case in which an operator performs a predetermined motion, should perform a process corresponding to the motion, the possibility can be sufficiently reduced of a process corresponding to the motion not being performed even though the operator has performed the motion.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within its scope.

1. Configuration 1-1. External View

Figure 1:
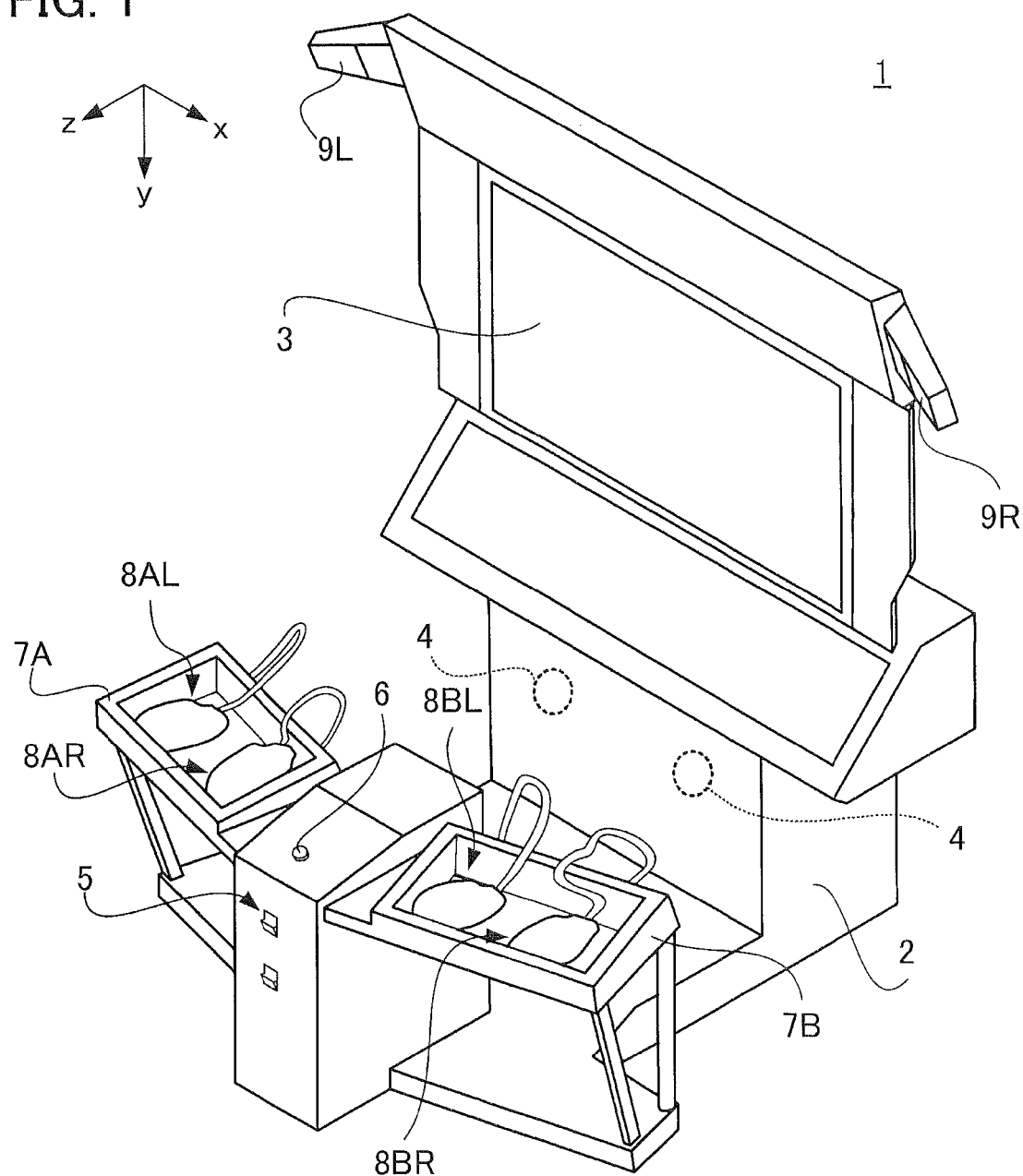
FIG. 1 is a perspective view showing an external view of a game apparatus 1 according to an embodiment of the present invention.

FIG. 1 is a perspective view showing an external view of game apparatus 1 according to an embodiment of the present invention. Game apparatus 1 is a game apparatus for a specific computer game (hereinafter referred to as "specific game"), and is installed at a game place such as a game arcade where visitors use the installed game apparatus by paying a fee. The specific game is a multiple-player game, in which, in a play of the game, two players cooperate with each other to defeat as many enemy characters as possible, operate each player's character, and cause each character to perform a desired action from among predetermined plural actions (motions).

The predetermined plural actions are roughly divided into actions of punching and actions of firing a gun (shooting device). The action of pushing is a hitting motion against an enemy character, and the action of firing a gun is a motion of shooting an enemy character by a gun. Each character, including an enemy character, is of virtual existence mimicking a human. Each character is supplied, at a start of a play of the specific game, with power that is reduced when the character is hit or shot. In a play of the specific game, each character falls when the remaining power (power that is still remaining) becomes equal to or below zero. In the following description, from among two players who cooperate with each other in a play of the specific game, one will be called "Player A", and the other will be called "Player B".

As shown in FIG. 1, game apparatus 1 has a housing 2 for accommodating a main unit 100 (described later). Housing 2 is fixed to the floor of a game place. Provided on the surface of the housing are a rectangular screen 3 for displaying images, speakers 4,4 for emitting various sounds in a play of the specific game, a coin acceptance slot 5 into which a coin is inserted by a player, a start button 6 that outputs a start signal when pressed down, and light receiving units 9L,9R for receiving infrared light. Players A and B stand facing screen 3, to perform a play of the specific game while viewing images displayed on screen 3 and also listening to the sounds emitted from speakers 4,4.

Further provided with housing 2 is a table 7A for Player A and a table 7B for Player B. There are placed, on table 7A, doughnut-shaped (ring-shaped) operating devices 8AL,8AR held by Player A and used for operating the player's character and, on table 7B, doughnut-shaped (ring-shaped) operating devices 8BL,8BR held by Player B and used for operating the player's character. Operating devices 8AL,8AR,8BL,8BR each are connected by a cable to housing 2 and are movable within the range of the length of the cable. In this example, communication between operating devices 8AL,8AR,8BL, 8BR and housing 2 is performed by wire, but this may also be performed wirelessly. In a case in which wireless communication is performed, the moving range of operating devices 8AL,8AR,8BL,8BR is increased.

In a play of the specific game, Player A will hold operating device 8AL in one hand (normally, the left hand) and operating device 8AR in the other hand (normally, the right hand). Player B will hold operating device 8BL in one hand (normally, the left hand) and operating device 8BR in the other hand (normally, the right hand).

In the following description, operating devices 8AL,8AR, 8BL,8BR will be collectively called "operating device 8". Also, light receiving units 9L,9R will be collectively called "light receiving unit 9". In the following description, as shown in FIG. 1, an axis extending perpendicularly with respect to screen 3 will be called "Axis z", an axis extending heightwise (toward a vertical direction) of game apparatus 1 will be called "Axis y", and an axis extending perpendicularly with respect to a plane including Axes x and y will be called "Axis z".

Figure 2:
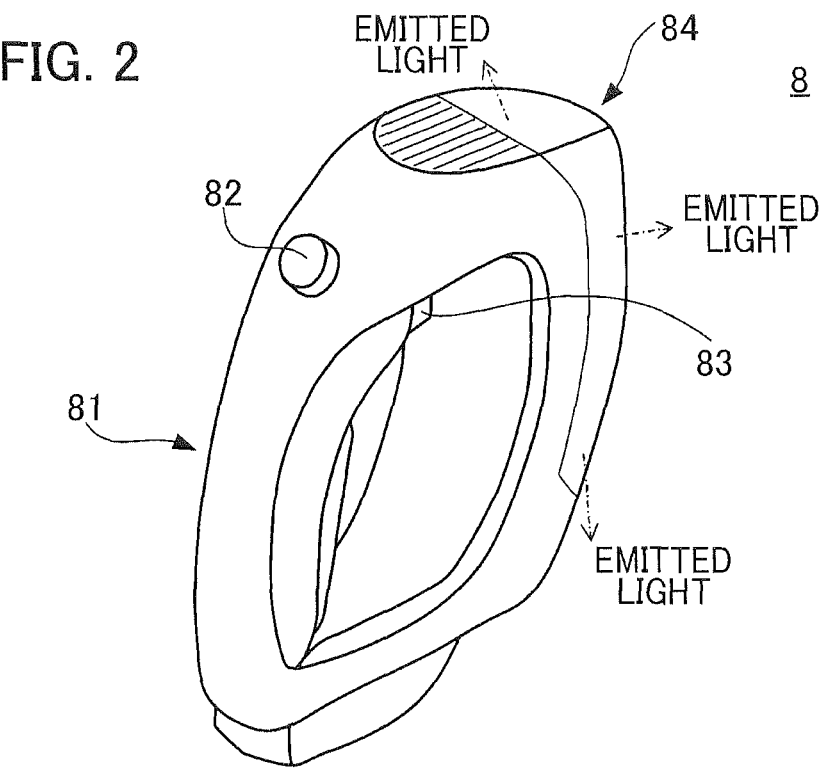
FIG. 2 is a perspective view showing an external view of an operating device 8 of game apparatus 1.

FIG. 2 is a perspective view showing an external view of operating device 8. As shown in the figure, a part of operating device 8 is a grip portion 81 that is easy for grasping, and a player puts the player's index finger, middle finger, and ring finger (annular finger) into the center hole of operating device 8 to grasp grip portion 81, thereby holding grip portion 81 in one hand. Operating device 8 is provided with an operation button 82 operated by a thumb, an operation button 83 operated by an index finger, and a light emitting unit 84 emitting infrared light. Light emitting unit 84 is provided on an outer rim of a portion facing grip portion 81 across the center hole of operating device 8.

Figure 3:
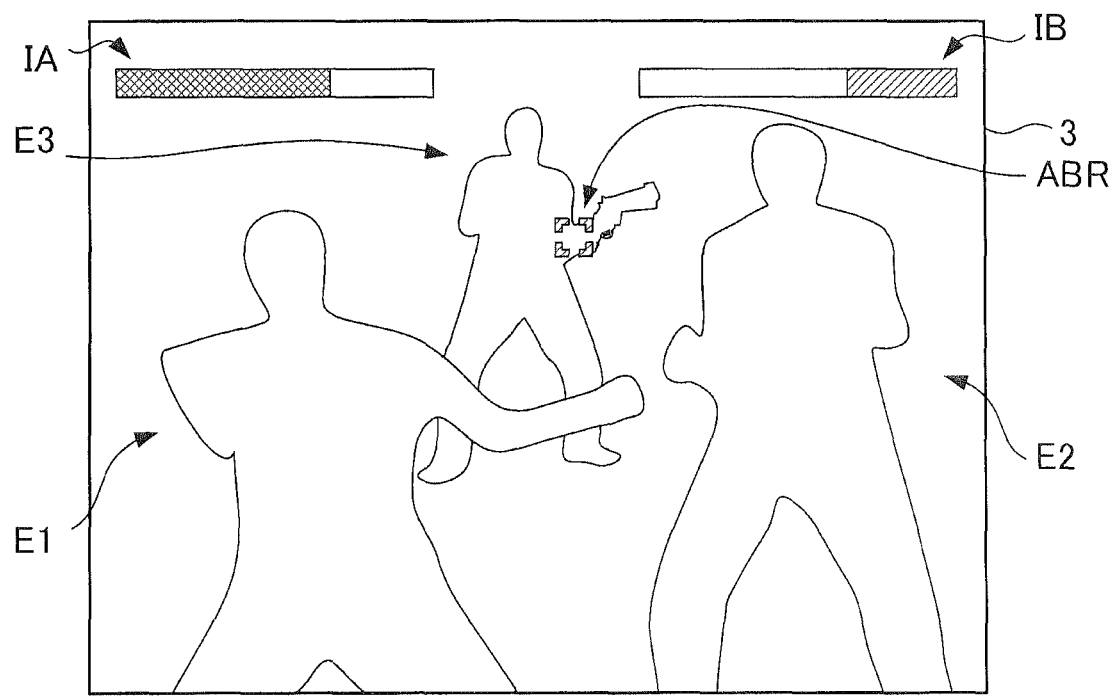
FIG. 3 is a diagram showing an example of an image displayed on a screen 3 of game apparatus 1.
Figure 4:
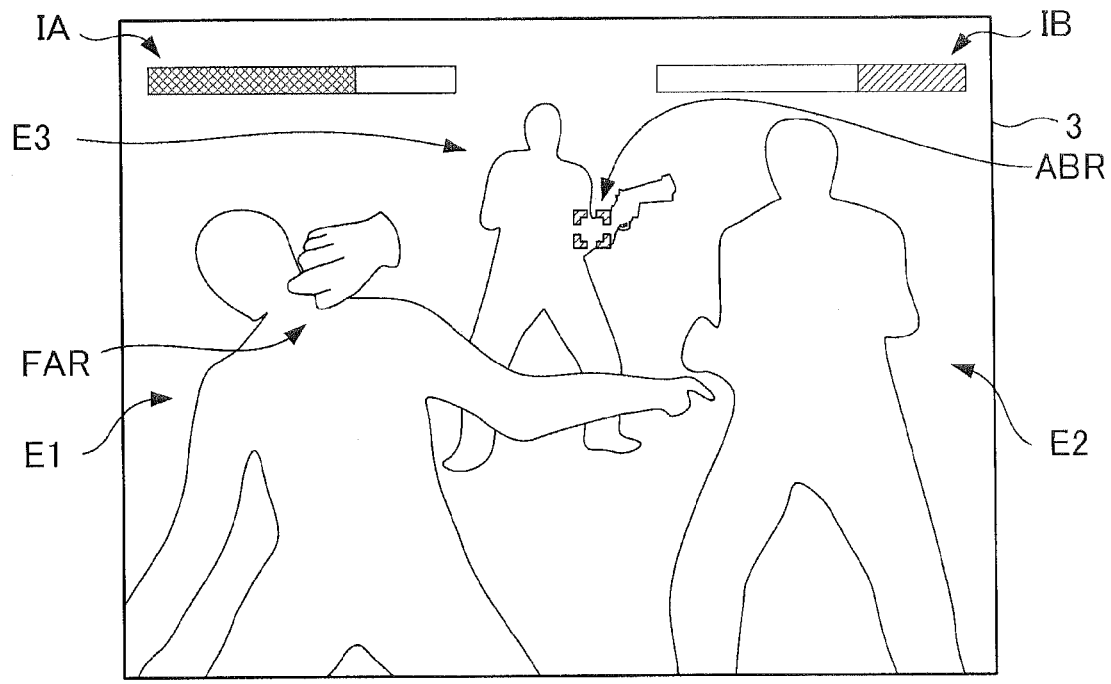
FIG. 4 is a diagram showing another example of an image displayed on a screen 3.
Figure 5:
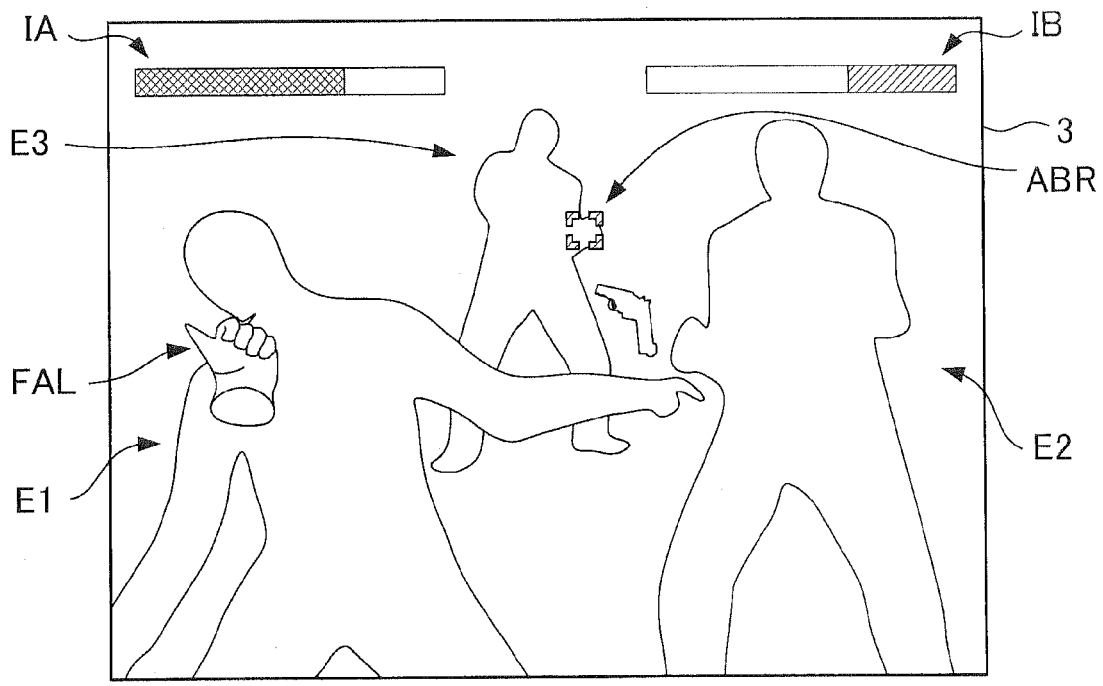
FIG. 5 is a diagram showing another example of an image displayed on a screen 3.

FIGS. 3 to 5 each are diagrams showing an example of an image displayed on screen 3. As shown in these figures, a projected image and indicators IA,IB are displayed on screen 3. The projected image is an image obtained by perceptively projecting a three-dimension imaginary space in which enemy characters (for example, enemy characters E1 to E3) and a player character are positioned onto a plane corresponding to screen 3. Indicator IA shows the remaining power of Player A's character, and indicator IB shows the remaining power of Player B's character.

Aim images AAL,AAR,ABL,ABR can be displayed on screen 3, the aim images indicating a position (hereinafter referred to as "aim position") at which a gun is aimed on screen 3. From among these aim images, aim image ABR is shown in the examples of FIGS. 3 to 5. Furthermore, in the imaginary space, the player character's fists FAL,FAR,FBL, FBR can be displayed. From among these fists, an example of FIG. 4 shows fist FAR, and an example of FIG. 5 shows fist FAL. Aim image AAL and fist FAL correspond to operating device 8AL, aim image AAR and fist FAR to operating device 8AR, aim image ABL and fist FBL to operating device 8BL, and aim image ABR and fist FBR correspond to operating device 8BR.

1-2. Electrical Configuration

Figure 6:
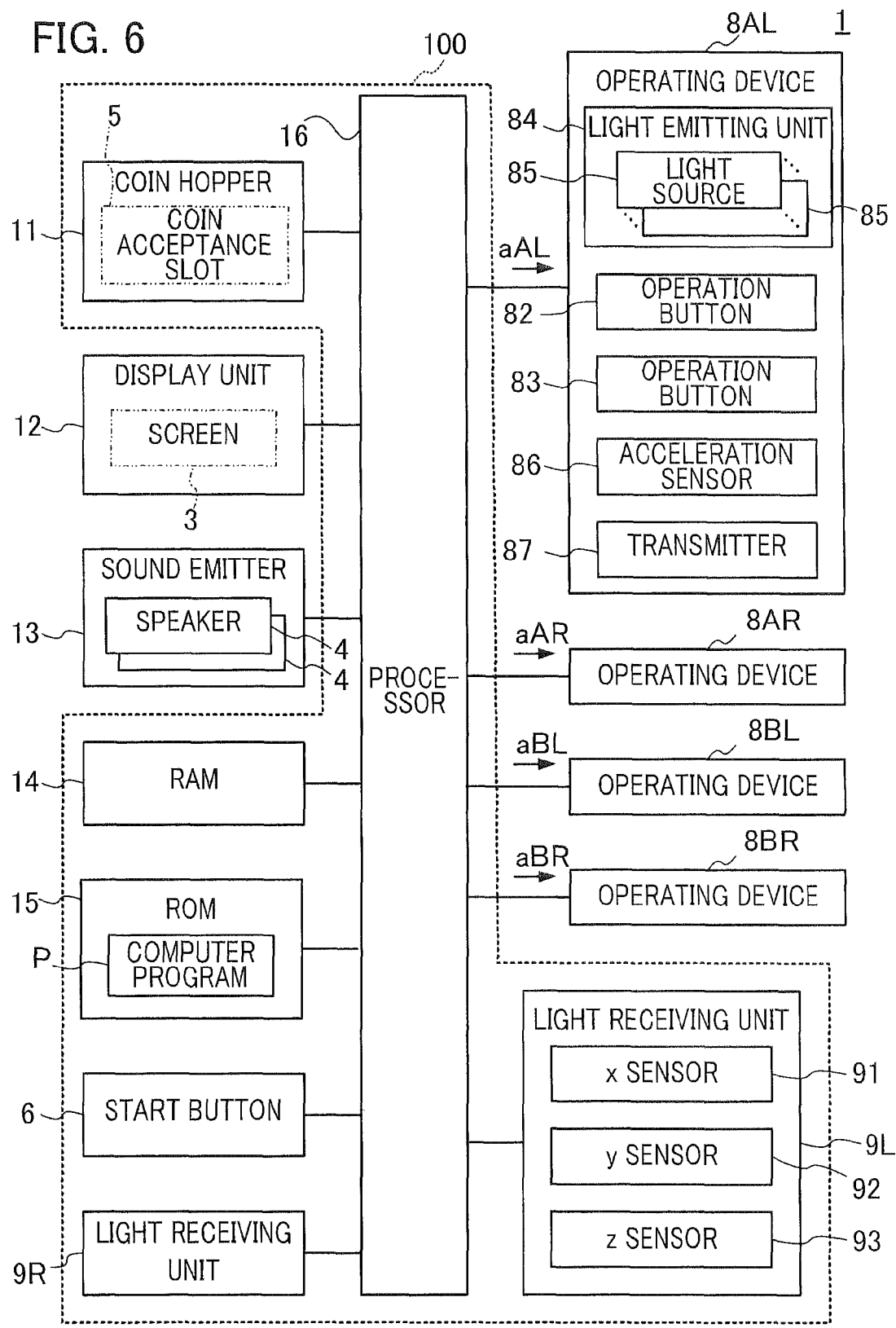
FIG. 6 is a block diagram showing an electrical configuration of game apparatus 1.

FIG. 6 is a block diagram showing an electrical configuration of game apparatus 1. Game apparatus 1, electrically, has a main unit 100 fixed on the floor of a game place, a display unit 12, a sound emitter 13 connected to main unit 100, and the above mentioned four operating devices 8. Display unit 12 and sound emitter 13 each are fixedly attached to main unit 100. Main unit 100 has a coin hopper 11, a start button 6, light receiving units 9L,9R arranged apart from each other, a RAM (Random Access Memory) 14, a ROM (Read Only Memory) 15, a processor 16, and a power switch (not shown) for supplying electricity to each unit.

Coin hopper 11 distinguishes coins inserted from coin acceptance slot 5, and the hopper accepts a coin if the coin is of a predetermined type (for example, hard currency) and outputs a signal indicating that the coin has been inserted. A play of the specific game is started when start button 6 is pressed down after one or more coins having monetary value corresponding to the fees for a single play of the specific game is inserted into coin acceptance slot 5. Thus, game apparatus 1 is so called a business-use game machine.

Display unit 12 has the above-described screen 3, and is for displaying on screen 3 an image represented by image data supplied from processor 16, and specifically is a display such as a CRT (Cathode Ray Tube). The present embodiment may be modified to use a video projector instead of the display. Sound emitter 13 is connected to the above main unit 100 and has the above-described speakers 4,4, and is for causing speakers 4,4 to emit sounds represented by sound data supplied from processor 16. Thus, display unit 12 and sound emitter 13 are outputters that output information to the outside of game apparatus 1.

Operating device 8 is movable as described above. Operating device 8 is also capable of transmitting a signal to, and receiving from, main unit 100. Furthermore, operating device 8 is held by a player of the specific game, and is capable of detecting the body motion of the player. Specifically, operating devices 8AL and 8AR are grasped by, thereby being held by, Player A, and operating devices 8BL and 8BR are grasped by, thereby being held by, Player B, and each operating device 8 is capable of, by an acceleration sensor 86 therein, detecting the body motion of a player who holds the same operating device 8.

Operating device 8 has the above-described grip portion 81, the above-described operation buttons 82,83, the above-described light emitting unit 84, an acceleration sensor 86, and a transmitter 87. Operation buttons 82,83 each output a unique signal when pressed. Acceleration sensor 86 detects acceleration, and outputs a signal indicating the detected acceleration (value), and specifically is so-called triaxial acceleration sensor. Transmitter 87 transmits, to processor 16 of main unit 100, signals output from acceleration sensor 86, operation button 82, and operation button 83, respectively, via a cable connecting this operating device 8 to housing 2.

Light emitting unit 84 has plural light sources (light emitter) 85 for emitting an infrared light, and controls the light emission of plural light sources 85 all together in accordance with a light emission control signal supplied from processor 16. Thus, operating device 8 serves as an operating device that has an acceleration sensor that detects acceleration, a light emitter that emits light, and a transmitter that transmits a value detected by the acceleration sensor to the main unit. Light source 85 is, specifically, an LED. The emission frequency of light source 85 is a frequency that does not interfere with the external light and specifically is about 170 KHz. The frequency has been in this manner because the external light in game places rarely includes a light of about 170 KHz in frequency.

The configuration of operating device 8 is determined so that the emitted light from light emitting unit 84 thereof can be readily received by light receiving units 9L,9R. The "configuration of operating device 8" is, for example, a configuration of light emitting unit 84 of the same operating device 8. The "configuration of light emitting unit 84" includes, for example, the number, the arrangement, and the characteristics of light sources 85 of the light emitting unit 84. The "characteristics of light source 85" include, for example, a spread angle of a beam of light of the light emitted from the light source 85.

Light receiving unit 9 has three infrared ray sensors. Each infrared ray sensor has a light-receiving plane, and is capable of receiving light emitted from light source 85, to output a signal indicating the intensity of the received light. In other words, light receiving unit 9 serves as a light receiver that receives light emitted from the light emitter and detects the intensity of the received light. From among the three infrared ray sensors, one having a light receiving plane vertical to Axis x is an x sensor 91, one having a light receiving plane vertical to Axis y is a y sensor 92, and one having a light receiving plane vertical to Axis z is a z sensor 93. Signals output from these three infrared sensors each are supplied to processor 16. The three light receiving planes of light receiving unit 9 are arranged in such a manner that perpendicular lines passing through the center point of each light receiving plane intersect at one point. Hereinafter, the position of this one point will be referred to as a "light receiving position".

Figure 7:
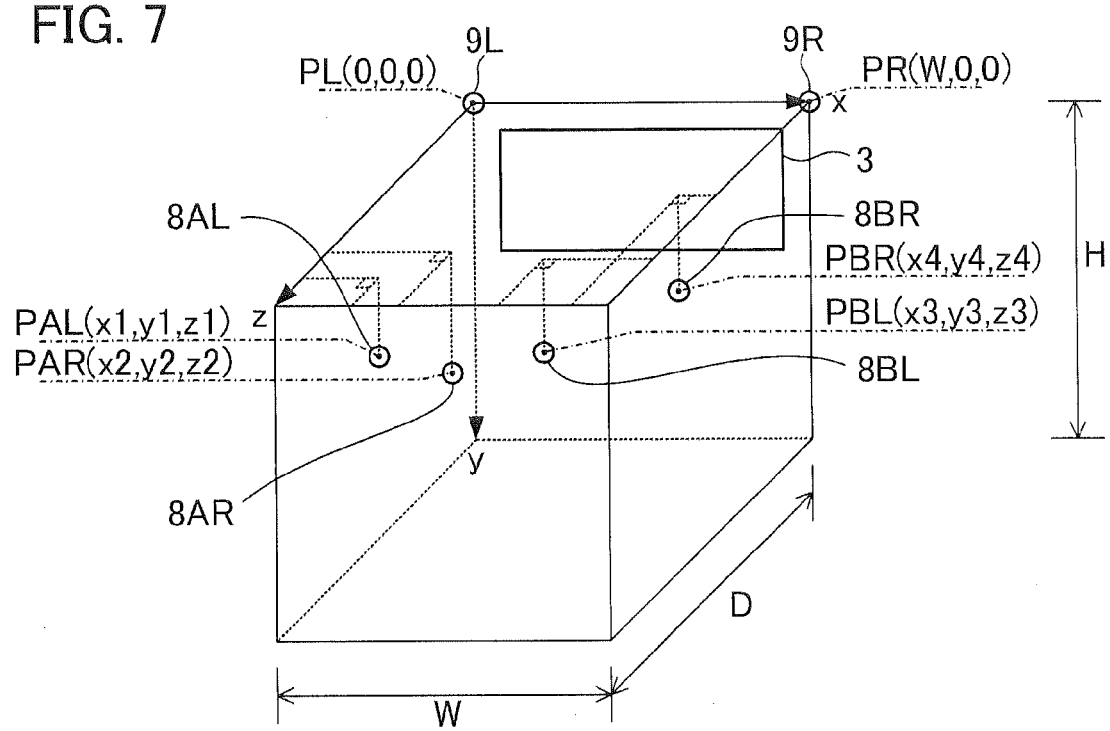
FIG. 7 is a conceptual diagram for describing a procedure of detecting a position of operating device 8.

FIG. 7 is a conceptual diagram for describing a procedure of detecting a position of operating device 8. The range of position detection is a rectangular parallelepiped-shaped space, shown in the figure, with the length W in the direction of the x-axis, the length H in the direction of the y-axis, and the length D in the direction of the z-axis. The range of position detection is a range in which the position of operating device 8 can be detected in the specific game, within a range in which operating device 8 is movable. The above rectangular parallelepiped-shaped space is located in the front of screen 3, and one of the six faces includes screen 3. The lengths of the top and the bottom lines of the face including screen 3 are both W, with one end, from among both ends of the top line, being at a light receiving position PR of light receiving unit 9L and the other end being at a light receiving position PL of light receiving unit 9R. In the present embodiment, screen 3, light receiving unit 9L, and light receiving unit 9R are arranged in such a way as to satisfy W=H=2 m. In the present embodiment, D=2 m is true, i.e., the range of the position detection is a rectangular parallelepiped-shaped space with 2 m on each side. The origin of the coordinate system of this space is at the light receiving position PL, and its coordinates are (0,0,0). In this coordinate system, the x-coordinate becomes larger as it is closer to the light receiving position PR, the y-coordinate becomes larger as it is closer to the floor of the game place, and the z-coordinate becomes larger as it moves away from screen 3. The coordinates of light receiving position PR of light receiving unit 9R are (W,0,0).

Description is now given, as an example, of a procedure for detecting the position of a light receiving position PAL of operating device 8AL. The "light emitting position" is the position of operating device 8 that has emitted lights received by light receiving units 9L and 9R. The emitted light from operating device 8AL is first received by light receiving units 9L and 9R. Then, three output signals are output from light receiving unit 9L. From among these output signals, output signals from x sensor 91 and y sensor 92 show a low intensity of light, and an output signal from z sensor 93 shows a high intensity of light. Therefore, it is possible to identify the direction of incidence of the light into the light receiving position PL based on these output signals. Similarly, it is possible to identify the direction of incidence of the light into the light receiving position PR based on three output signals from light receiving unit 9R. Therefore, the light emitting point PAL can be obtained on the same principle with the triangulation.

Figure 8:
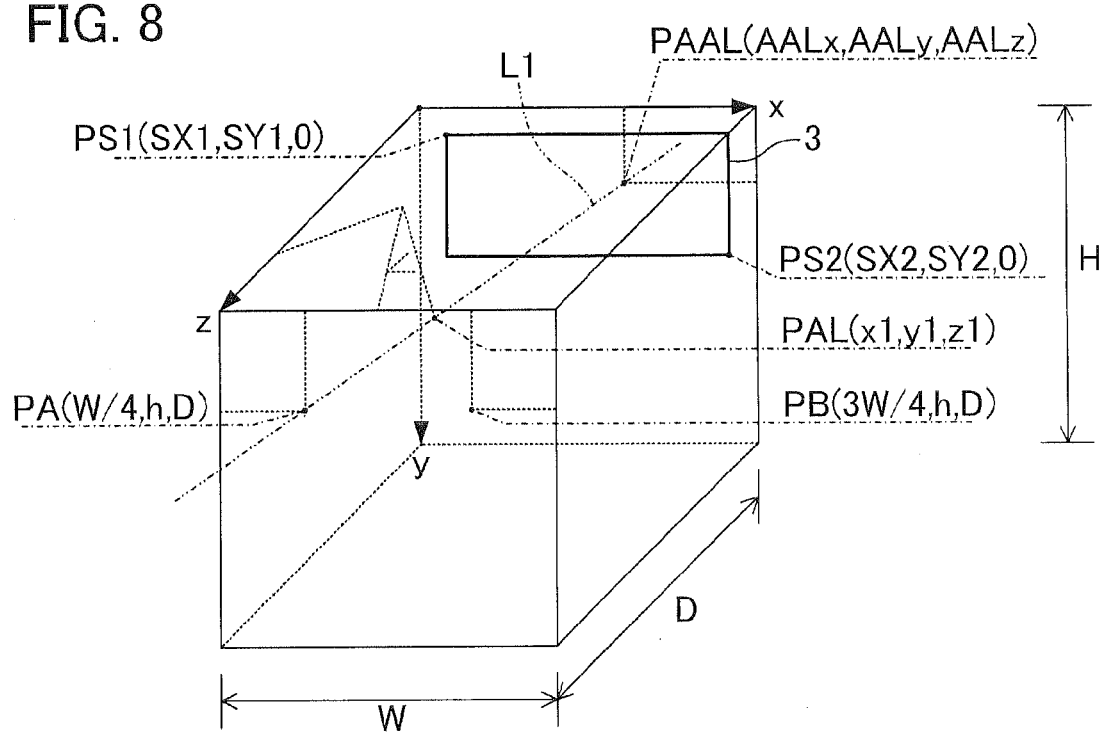
FIG. 8 is a conceptual diagram for describing a procedure of detecting an aim position.

FIG. 8 is a conceptual diagram for describing a procedure of detecting an aim position. The aim position is settled for each operating device 8, and the aim position of one operating device 8 is the position of an intersection point of screen 3 with a straight line passing through the standard position of a player grasping the operating device 8 and the position of the operating device 8. The standard position of a player is the position of a midpoint of a line segment connecting both shoulders of the player when the player stands directly in front of screen 3. Specifically, as shown in FIG. 8, the coordinates of the Player A's standard position PA are (W/4,h,D), and the coordinates of the Player B's standard position PB are (3W/4,h,D). The letter h is a fixed value indicating the height of the shoulder. The present embodiment may be modified so that h can be set by a player, or alternatively, a game apparatus may measure physical information such as the height of a player and the breadth of the player's shoulder so that h is automatically set.

Description will now be given, as an example, of a procedure for detecting an aim position PAAL of operating device 8AL. The light emitting position PAL (coordinates (x1,Y1,z1)) of operating device 8AL is first obtained by the above-described procedure. Then, a straight line L1 passing through the obtained light emitting position PAL and the standard position PA (coordinates (W/4,h,D)) of Player A grasping operating device 8AL is obtained. Next, aim position PAAL (coordinates (AALx,AALy,AALz)) is obtained, the aim position PAAL being the position of an intersection point of the obtained straight line L1 with screen 3. It should be noted that screen 3 and light receiving unit 9L are both fixed, and the positional relationship between screen 3 and light receiving unit 9L is known. Therefore, the coordinates of the vertex defining the range of screen 3 (for example, the coordinates (SX1,SY1,0) of a vertex PS1 that is the closest to the origin and the coordinates (SX2,SY2,0) of a vertex PS2 that is the opposing corner of the vertex PS1) are known.

The type of light source 85 is the same among light emitting units 84. Therefore, when plural light emitting units 84 simultaneously emit the light, it then becomes difficult to detect a light emitting position. Accordingly, in game apparatus 1, light emission control signals to be supplied to each light emitting unit 84 are different from one another so that the light source 85 of each light emitting unit 8 emits light when other light sources 85 of other operating devices 8 are not emitting light. Specifically, an emission control signal aAL is supplied to operating device 8AL, an emission control signal aAR to operating device 8AR, an emission control signal aBL to operating device 8BL, and an emission control signal aBR to operating device 8BR. The supplier of these emission control signals is processor 16. Therefore, processor 16 makes the light emitting unit of each operating device emit the light when other operating devices are not emitting the light.

Figure 9:
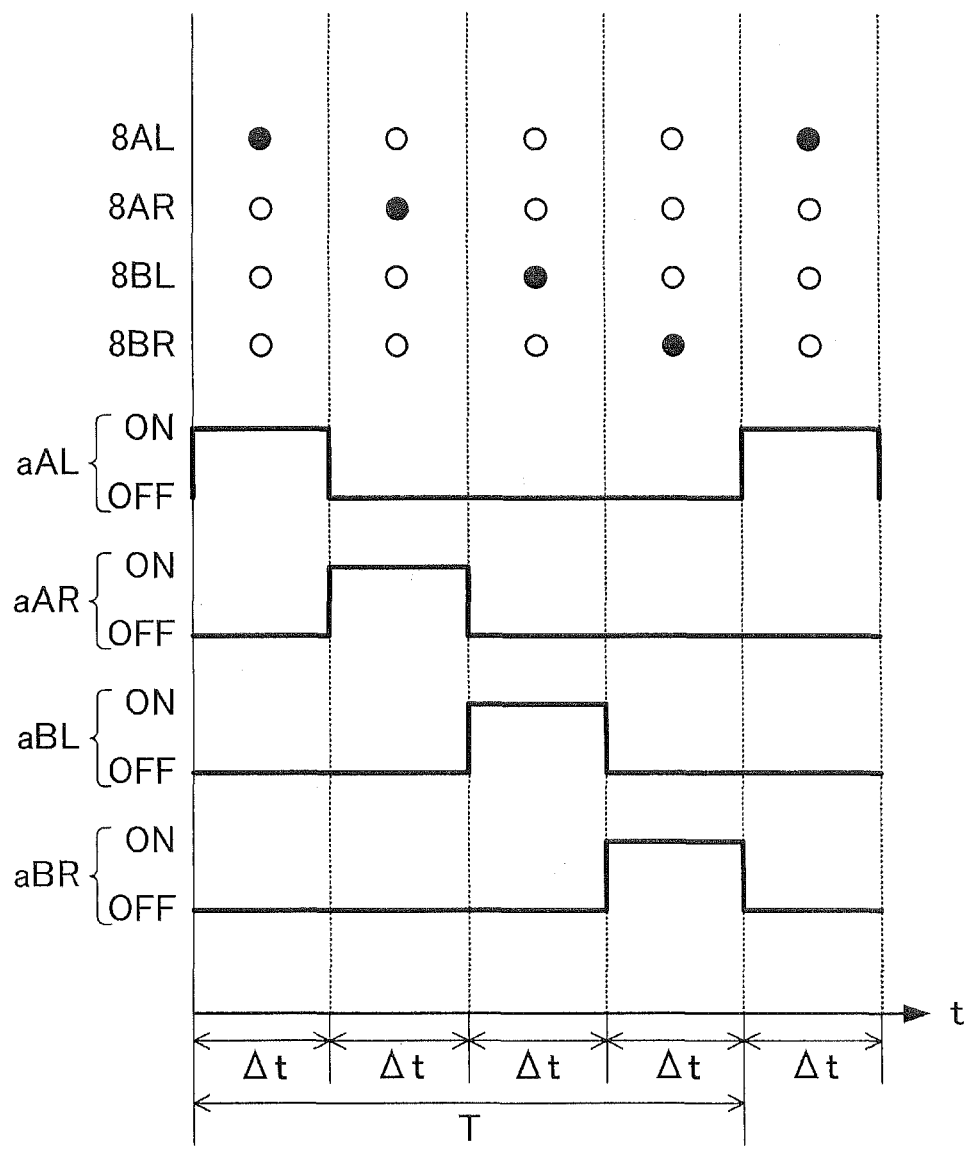
FIG. 9 is a diagram for describing light emission control of operating devices 8AL,8AR,8BL,8BR of game apparatus 1.

FIG. 9 is a diagram for describing the light emission control of operating devices 8AL,8AR,8BL,8BR. As shown in the figure, in a play of the specific game, the position of the same operating device 8 is detected periodically in a cycle T (for example, 16 ms). Given that the cycle T is divided into four unit periods of Δt each, only the emission control signal aAL will be in an on-state in the first unit period, only the emission control signal aAR in the second unit period, only the emission control signal aBL in the third unit period, and only the emission control signal aBR in the fourth unit period. Therefore, in each cycle, only the operating device 8AL emits the light in the first unit period, only the operating device 8AR in the second unit period, only the operating device 8BL in the third unit period, and only the operating device 8BR in the fourth unit period. Thus, operating devices 8AL,8AR,8BL, 8BR emit the light time-divisionally.

Figure 10:
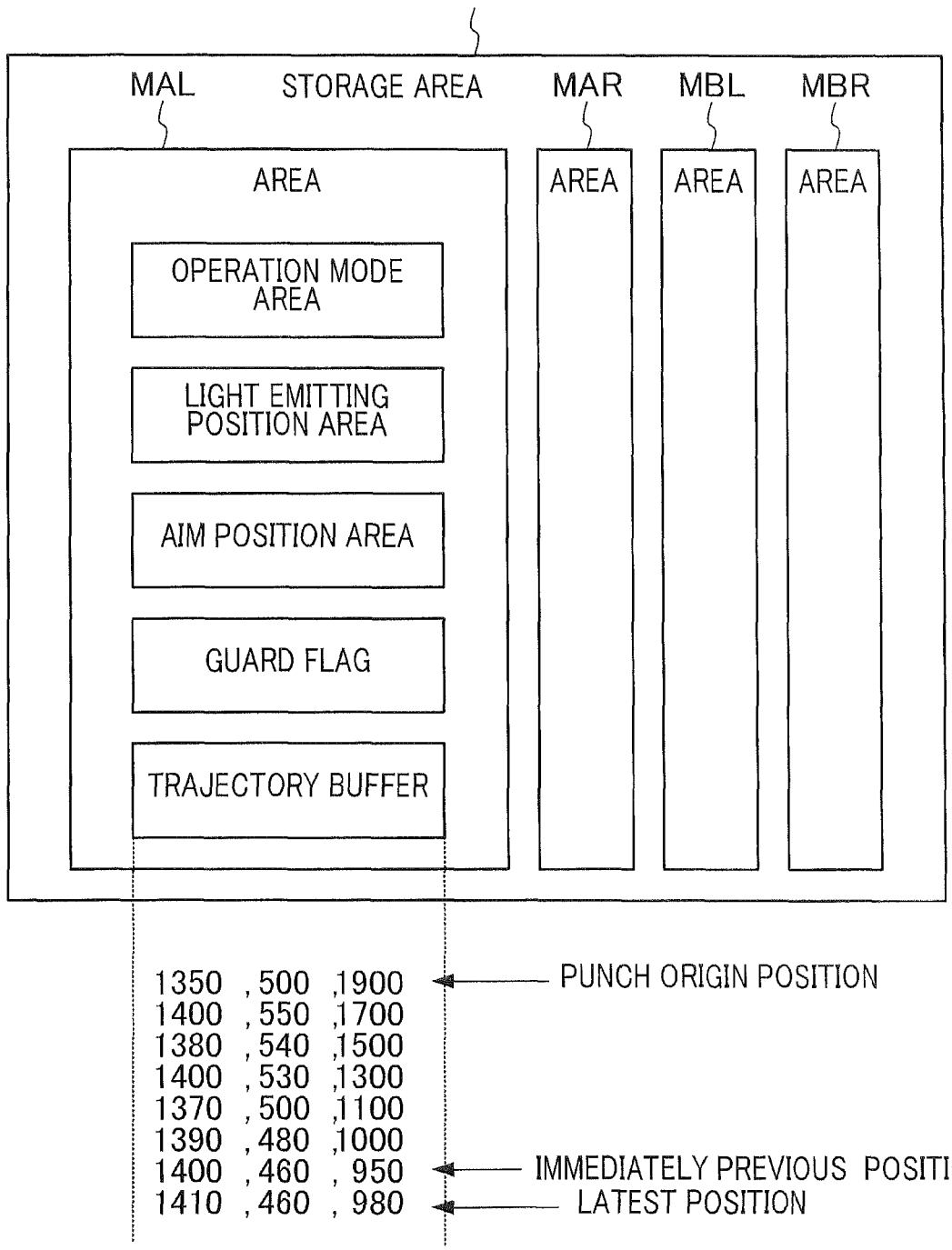
FIG. 10 is a diagram showing a memory map of a RAM 14 in game apparatus 1.

FIG. 10 is a diagram showing a memory map of RAM 14. This memory map is as of when a play of the specific game is being performed. RAM 14 is a storage device for storing the history of the positions (the positions of each operating device 8 (the light emitting position of each light emitting unit 84)) detected by a position detector described below, and the memory area 141 of RAM 14 includes an area MAL corresponding to operating device 8AL, an area MAR corresponding to operating device 8AR, an area MBL corresponding to operating device 8BL, and an area MBR corresponding to operating device 8BR.

Each area includes an operation mode area in which data showing an operation mode is retained, a light emitting position area in which data showing the light emitting position of light emitting unit 84 is retained, an aim position area in which data showing an aim position is retained, a guard flag showing whether the player is in a guard state, and a trajectory buffer capable of retaining plural sets of data showing a position. The operation modes include a punch mode for operating a player character's one hand not holding a gun and a shooting mode for operating one hand holding a gun. In a case in which data showing the punch mode is written in the operation mode area, the operation mode is set to the punch mode. The light emitting position of light emitting unit 84 is used as the position of operating device 8 having this light emitting unit. The "guard" of the guard state is what they call a guard in boxing. The trajectory buffer is used for detecting a punch, and as shown in the figure, plural sets of data each indicating coordinates are retained in order of detection. In particular, the data stored in the top of the trajectory buffer indicates a position of a start point (the origin) of the punch trajectory. Hereinafter, this position will be called "punch origin position".

Referring again in FIG. 6, ROM 15 retains written data, thereby storing information indicated by the data, and stores a computer program P executed by processor 16. Processor 16, when the power switch (not shown) is turned on, reads the computer program P from ROM 15 for execution. By this execution, processor 16 performs a game process for causing a player to play the specific game.

2. Operation

Figure 11:
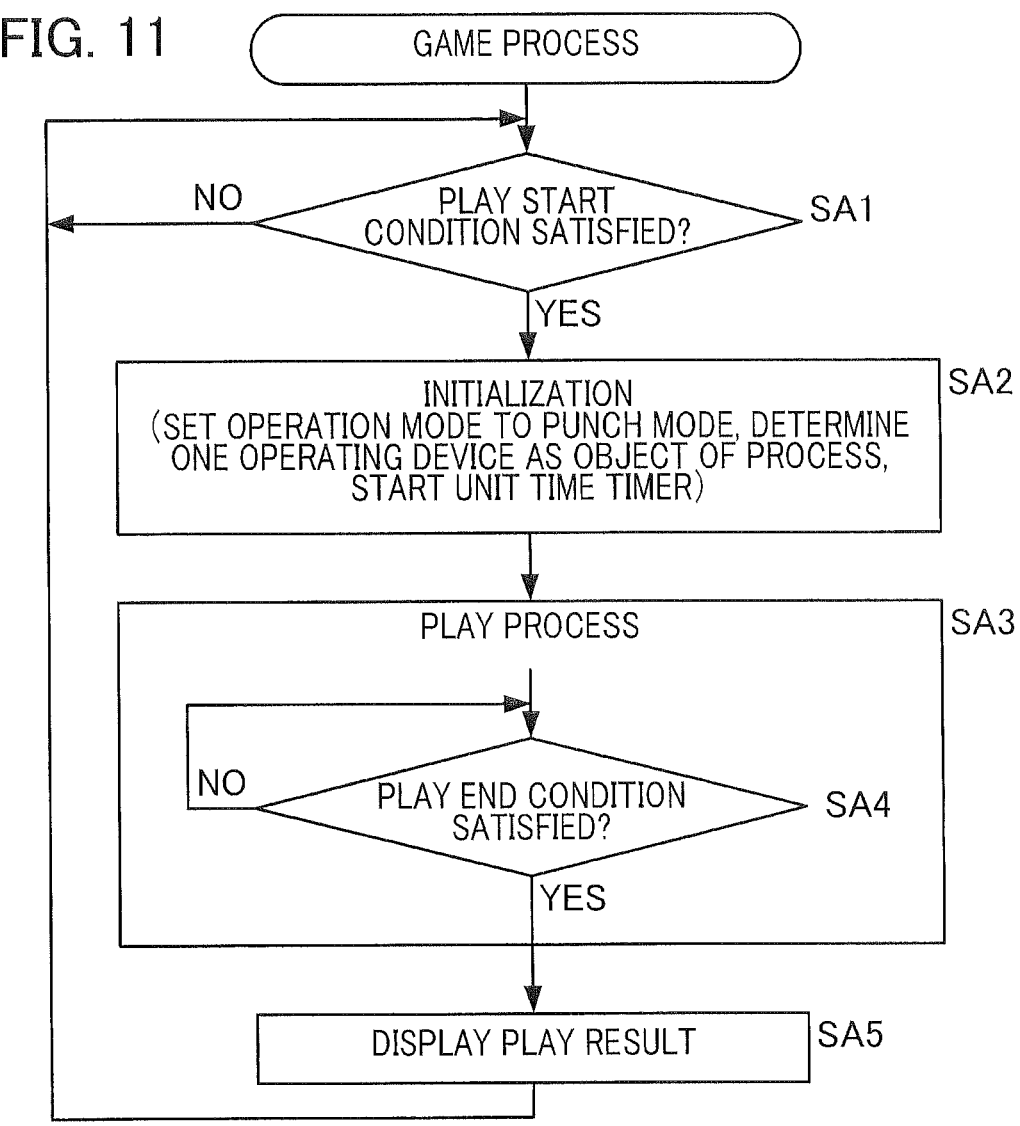
FIG. 11 is a flowchart showing a procedure of game process of game apparatus 1.

FIG. 11 is a flowchart showing a procedure of a game process. In the game process, processor 16 first determines whether conditions for starting a play are satisfied (SA1). Specifically, based on a signal from coin hopper 11 and a start signal from start button 6, the processor determines whether start button 6 is pressed down after one or more coins having monetary value corresponding to the tees for a single play of the specific game is inserted into coin acceptance slot 5. In a case in which a result of this determination is NO, the process returns to Step SA1.

In a case in which a result of the determination in Step SA1 is YES, processor 16 performs initialization prior to the start of the play (SA2). Specifically, the operation mode is first set to a punch mode. Second, one operating device 8 (for example, operating device 8AL) is determined as an object of the process. Third, a unit time timer is started. The unit time timer is a timer that expires when time Δt has elapsed since its start, and is implemented, for example, by processor 16.

Next, processor 16 performs a play process for advancing the specific game using display unit 12 (SA3). Thus, processor 16 serves as a game executor capable of advancing the specific game using display unit 12. In the play process, processor 16 executes, in parallel, a light emission control process for performing the light emission control shown in FIG. 9, and a display process for generating and displaying an image, an operation process corresponding to an operation of a player, a position detection process for detecting the position of operating device 8, a process for performing an attack receiving process every time an attack from an enemy character hits a player character, and a process of repeatedly determining whether conditions for ending the play are satisfied (Step SA4: NO). The operation process is executed for each operating device 8. The attack receiving process is executed by each player. Although it will be described later in detail, in the position detection process, processor 16 serves as a position detector that performs a process of detecting the position of operating device 8 based on the intensity of received light detected by each light receiving unit 9. The above play process ends in a case in which a result of the determination in Step SA4 changes to YES. The conditions for ending a play are satisfied when the remaining power of Players A and B changes to equal to or below zero. Subsequently, processor 16 causes display unit 12 to display a play result. The play result is, for example, the number of enemies the player defeated. Hereinafter, the process returns to Step SA1.

Figure 12:
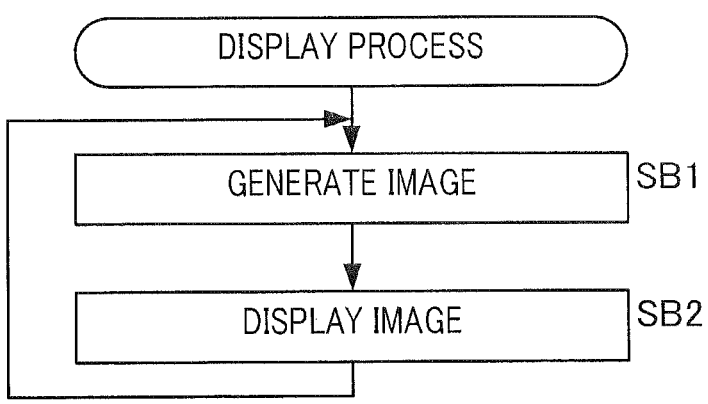
FIG. 12 is a flowchart showing a procedure of a display process of game apparatus 1.

FIG. 12 is a flowchart showing a procedure of the display process. In the display process, processor 16 repeatedly repeats a process of generating an image which display unit 12 is caused to display (SB1) and a process of causing display unit 12 to display the generated image (SB2). In the process of generating an image, a process of generating a projection image and a process of synthesizing the generated projection image and other images are performed in sequence. Always included as other images are indicators IA and IB. The process of generating the projection image is performed, in a case in which a player performed a hitting motion, after the fist of the player character is arranged in the imaginary space to be projected. Also, other images can include at least one of aim images AAL, AAR, ABL, or ABR. Specifically, from among these aim images, those having its aim position in screen 3 are included in other images. Whether an aim position is in or off screen 3 is determined by processor 16 based on coordinates of the aim position. Specifically, processor 16 determines that the aim position is off screen 3 in a case in which the coordinates in the aim position area of RAM 14 are (0,0,0), and otherwise determines that the aim position is in screen 3b.

Figure 13:
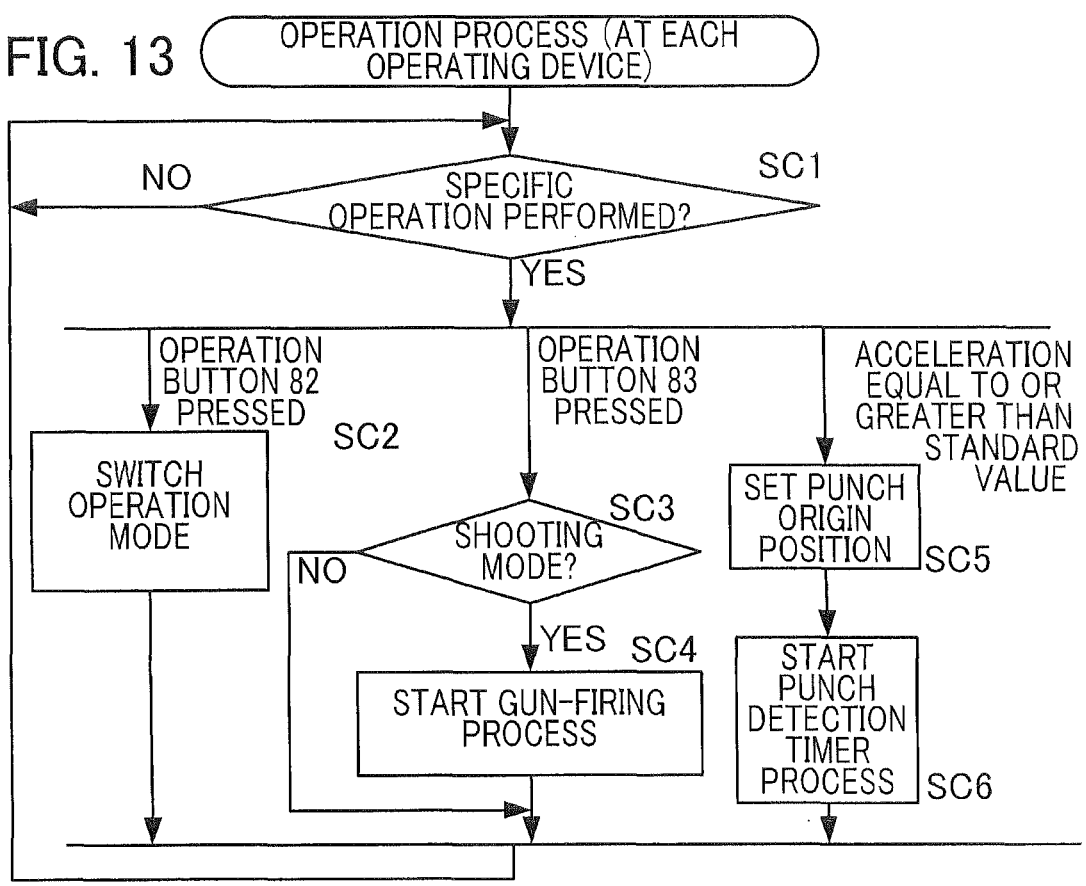
FIG. 13 is a flowchart showing a procedure of an operation process of game apparatus 1.

FIG. 13 is a flowchart showing a procedure of the operation process. The operation process is executed in parallel for each operating device 8. In the operation process, processor 16 first determines whether a specific operation was performed at operating device 8 that is an object of the process (SC1). In a case in which a result of the determination is NO, the process returns to Step SC1. In a case in which a result of the determination in Step SC1 is YES, the subsequent process depends on a specific operation performed.

In a case in which the specific operation performed was the pressing down of operation button 82, processor 16 switches the operation mode of operating device 8 that is an object of the process (SC2). Hereinafter, the process returns to Step SC1. In a case in which the specific operation performed was the pressing down of operation button 83, processor 16 determines whether the operation mode of operating device 8 that is an object of the process is a shooting mode (SC3). Only in a case in which a result of the determination is YES, processor 16 starts a gun-firing process for causing the character to fire a gun with respect to operating device 8 that is an object of the process (SC4). Hereinafter, the process returns to Step SC1.

In a case in which the specific operation performed was an operation that has caused acceleration, directed toward screen 3, of equal to or greater than the predetermined standard value in operating device 8 that is an object of the process, processor 16 sets the punch origin position (SC5). Specifically, the processor clears the trajectory buffer corresponding to operating device 8 that is an object of the process, and adds to the trajectory buffer a position stored in the light emitting position area of the operating device 8 when the acceleration was caused. Adding the position to the trajectory buffer means adding data showing the coordinates of the position to the trajectory buffer. However, in Step SC5, in a case in which the punch detection timer for detecting a punch for operating device 8 that is an object of the process is keeping time, processor 16 first stops the punch detection timer process before adding the position to the trajectory buffer. Although later described in detail, the punch detection timer process is a process of starting a corresponding punch detection timer and clearing the corresponding trajectory buffer when the time keeping operation by this punch detection timer ends. Therefore, the position added to the trajectory buffer in Step SC5 will be the punch origin position. It is to be noted that the punch detection timer is implemented, for example, by processor 16. Processor 16 then starts the punch detection timer process (SC6). Hereinafter, the process returns to Step SC1.

Figure 14:
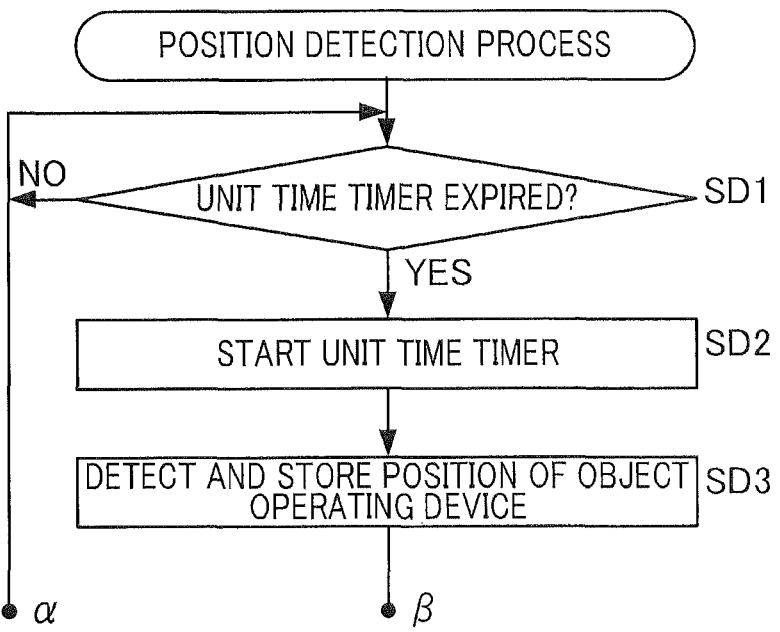
FIG. 14 is a part of a flowchart showing a procedure of a position detection process of game apparatus 1.
Figure 15:
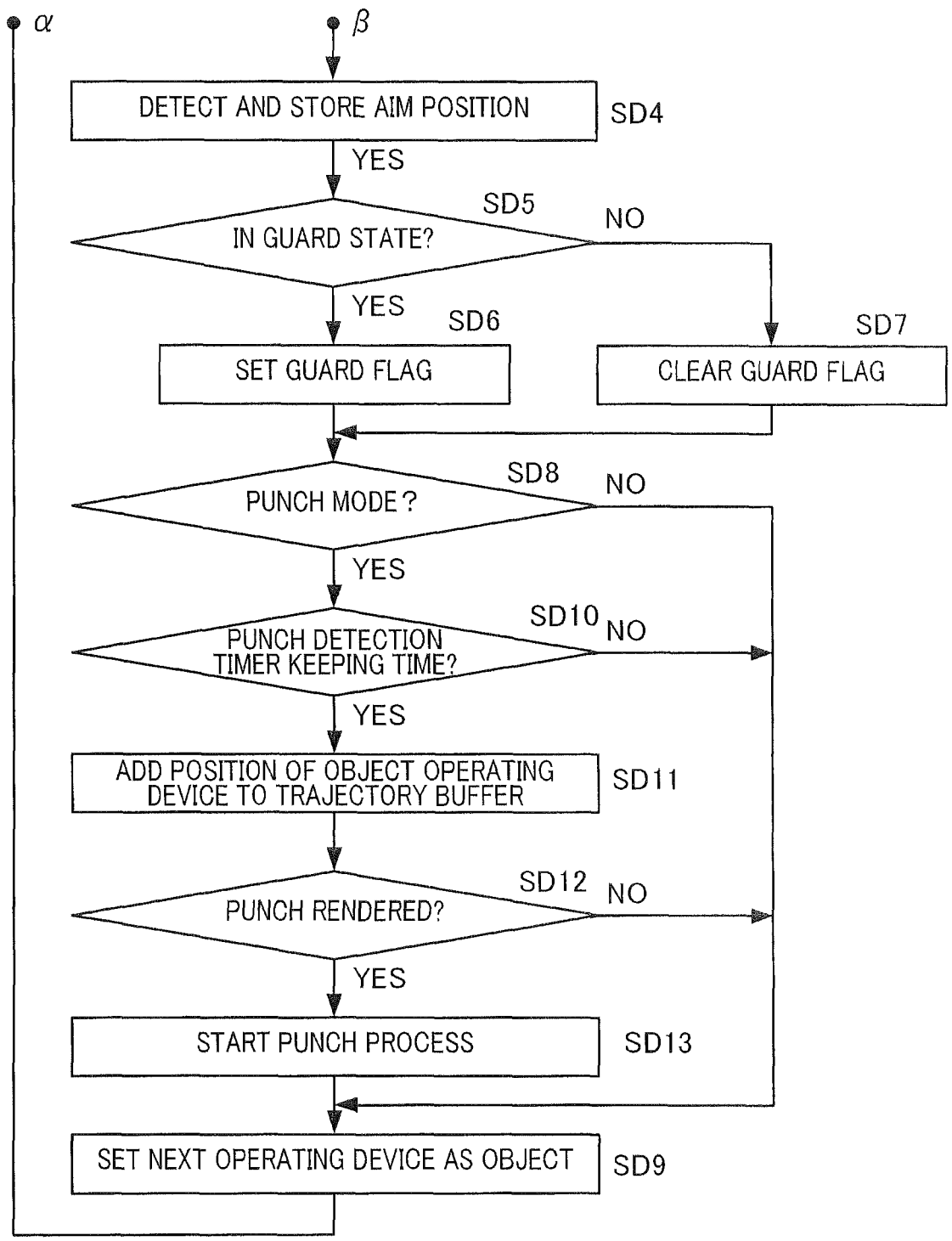
FIG. 15 is a part of the flowchart showing the procedure of the position detection process of game apparatus 1.

FIGS. 14 and 15 are connected with each other at connection points α (alpha) and β (beta) and show a flowchart showing a procedure of a position detection process. In the position detection process, processor 16 determines whether a unit time timer has expired (SD1). The unit time timer is implemented, for example, by processor 16. In a case in which a result of the determination is NO, the process returns to Step SD1. In a case in which a result of the determination in Step SD1 is YES, processor 16 causes the unit time timer to start (SD2).

Processor 16 then detects and stores the position of an operating device (for example, operating device 8AL) that is an object of the process (SD3). Specifically, based on the total of three signals supplied from the x sensor 91, y sensor 92, and z sensor 93 of light receiving unit 9L and the total of three signals supplied from the x sensor 91, y sensor 92, and z sensor 93 of light receiving unit 9R, the processor detects the light emitting position of the operating device that is an object of the process, to write the coordinates of the position into an area of RAM 14 corresponding to this operating device. It is to be noted, in the following description, an operating device that is an object of the process will be called "an object operating device".

Processor 16 then detects and stores an aim position (SD4). Specifically, the processor calculates a straight line passing through the position detected in Step SD3 and the standard position of a player who grasps the object operating device, then calculates an intersection point position on screen 3 of this straight line with screen 3, and writes the coordinates of the intersection point into an area, of RAM 14, corresponding to the operating device 8. Thus, processor 16 serves as an intersection point position calculator that calculates an intersection point position on a screen, the intersection point being where a straight line passing through the position of an operating device detected by the position detector and the predetermined standard position intersects the screen. This intersection point position is the same as the above-mentioned aim position. In other words, the aim image is also an image indicating the intersection point of the straight line with the screen. Furthermore, as described above, in Step SB2 of FIG. 12, an image to be displayed on screen 3 is generated by synthesizing the generated projection image and the aim image having the aim position in screen 3. This synthesis is performed so that the aim image is displayed on the aim position. Therefore, processor 16 serves as a display controller that controls a display unit so that an image indicating the intersection point is displayed at the intersection point position on the screen. It is to be noted that, in Step SD4, in a case in which the straight line does not intersect with screen 3, processor 16 regards the coordinates (0,0,0) of the origin as the coordinates of the aim position, and writes the coordinates in the aim position area of RAM 14. Thus, processor 16 serves as an in-or-off-screen determiner that determines whether the straight line intersects the screen. Furthermore, as described above, considering that whether the aim position is in or off screen 3 is determined depending on whether the coordinates of the aim position is (0,0,0), processor 16 serves as a storage controller to cause the storage device to store a result of the determination by the in-or-off-screen determiner.

Subsequently, processor 16 determines whether an arm of a player who grasps the object operating device is in a guard state (SD5). This result of the determination changes to YES when the position of the object operating device is within a predetermined range from the standard position of the player who grasps the operating device and when the coordinates of the aim position is (0,0,0), and otherwise changes to NO. In a case in which a result of the determination is YES, processor 16 sets the guard flag corresponding to the object operating device (SD6), and clears the guard flag in a case in which the result is NO (SD7).

Processor 16 then determines whether an operation mode of the object operating device is a punch mode (SD8). In a case in which a result of the determination is NO, processor 16 sets a next operating device 8 (for example, operating device 8AR) as the object operating device (SD9). Conversely, in a case in which a result of the determination in Step SD8 is YES, processor 16 determines whether a punch detection timer corresponding to the object operating device is keeping time (SD10). In a case in which a result of the determination is NO, the process advances to Step SD9.

On the other hand, in a case in which a result of the determination in Step SD10 is YES, processor 16 adds the position of the object operating device to the trajectory buffer of the object operating device (SD11). Processor 16 then refers to the trajectory buffer corresponding to the object operating device, to determine whether a punch was rendered (SD12). In this instance, coordinate strings showing the trajectory of the object operating device from the punch origin line up in the trajectory buffer of the object operating device, a result of the determination in Step SD12 changes to YES when a predetermined condition is satisfied, and otherwise changes to NO.

Specifically, given that the distance between a position in the trajectory buffer and the punch origin is regarded as a determination distance, the result of the determination changes to YES when the determination distance for the latest position in the trajectory buffer is smaller than the determination distance for the immediately previous position and when the determination distance for the immediately previous position is equal to or greater than the predetermined standard distance (for example, 700 mm). For example, in an example of FIG. 10, the latest coordinates (1410,460,980) in the trajectory buffer corresponding to operating device 8AL is closer to the punch origin than its immediately previous coordinates (1400,460,950) and the distance between the immediately previous coordinates (1400,460,950) and the punch origin is greater than 700 mm. Therefore, when the standard distance is 700 mm, the above result of the determination will be YES.

Thus, processor 16 serves as a motion determiner that determines whether an operator performed a hitting motion based on the position history of the operating device and the detected values of the acceleration sensor. This motion determiner determines whether a hitting motion was performed based on the relationship between a first determination distance with respect to a first position detected by the position detector at a point in time and a second determination distance with respect to a second position detected by the position detector immediately before the detection of the first position, the determination distance being the distance between a position detected by the position detector after the origin was detected and the origin, with the origin being a point of a position detected by the position detector immediately before acceleration equal to or greater than the predetermined standard value is detected by the acceleration sensor. Furthermore, this motion determiner determines that a hitting motion was performed when the first determination distance of the first position is smaller than the second determination distance of the second position and when the second determination distance of the second position is greater than the predetermined standard distance.

However, in Step SD12, in a case in which the coordinates of an aim position stored in the aim position area of RAM 14 are (0,0,0), processor 16 does not determine that a punch was rendered but determines that a punch was not rendered. Thus, processor 16, as the motion determiner, determines that an operator did not perform a predetermined motion in a case in which a result of the determination stored in the storage device is negative. As a result, in a case in which, for example, a player performs a motion of directing operating device 8 off screen 3, attempting to guard the player, it becomes possible to avoid erroneously detecting this motion as a punch.

In a case in which a result of the determination in Step SD12 is NO, the process advances to Step SD9. On the other hand, in a case in which a result of the determination is YES, processor 16 starts a punch process of causing a character to render a punch (SD13). Hereinafter, the process advances to Step SD9. In a case in which Step SD9 ends, the process returns to Step SD1. Thus, processor 16, as the position detector, performs the above-described process repeatedly, and cyclically, for operating devices 8AL,8AR,8BL,8BR.

Figure 16:
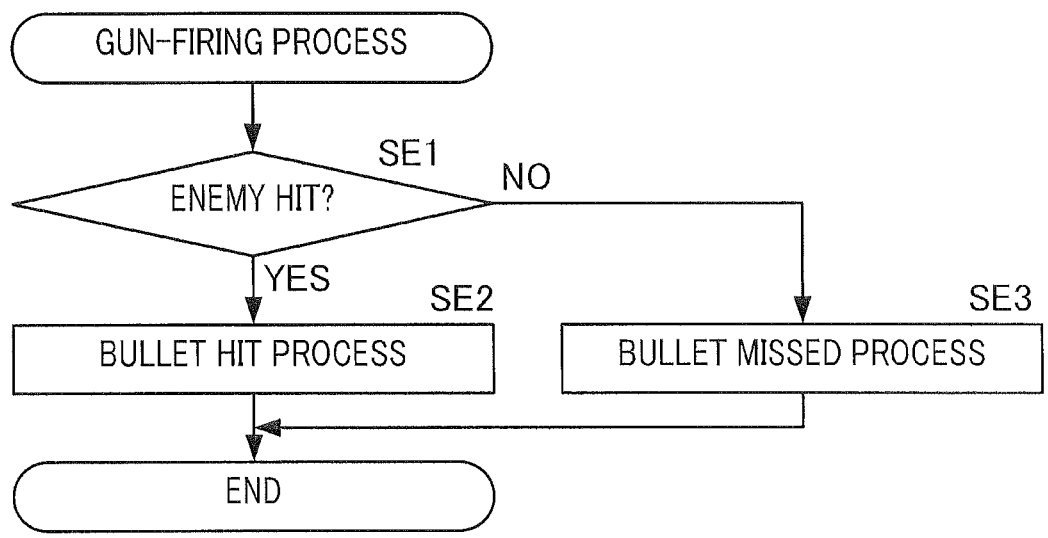
FIG. 16 is a flowchart showing a procedure of a gun-firing process of game apparatus 1.

FIG. 16 is a flowchart for showing a procedure of the gun-firing process. In the gun-firing process, processor 16 determines whether a bullet fired by the operation of a corresponding operating device 8 hits an enemy character (SE1). Specifically, the processor determines whether a straight line passing through the position of the corresponding operating device 8 and the aim position intersects with the enemy character in the imaginary space. Thus, processor 16, as a game executor, advances the specific game based on the intersection point position on screen 3 and a signal from operating device 8. The method for determination may be freely selected. For example, the processor may obtain an area occupied by an enemy character in screen 3 to determine whether the above straight line passes through this area, or alternatively, elongates the above straight line into the imaginary space, to determine whether this straight line intersects with the enemy character. In a case in which a result of the determination is YES, processor 16 performs a bullet hit process (SE2).

Specifically, the processor identifies an enemy character hit by the bullet (enemy character E3 in FIG. 5) and a hit portion, to perform a process of reducing the remaining power of the enemy character by setting the damage to the enemy character based on the identified result, and also to perform a production process based on the identified result using display unit 12 and sound emitter 13. For example, in an example of FIG. 5, the sound of a gunshot is emitted from speaker 4,4, and an image showing enemy character E3 who was hit in the left hand dropping a gun from the left hand suffering damages is displayed. On the other hand, in a case in which a result of the determination in Step SE1 is NO, processor 16 performs a bullet missed process (SE3). Specifically, the processor causes sound emitter 13 to emit the sound of gunfire. When the process in Step SE2 or SE3 is completed, the gun-firing process ends.

Figure 17:
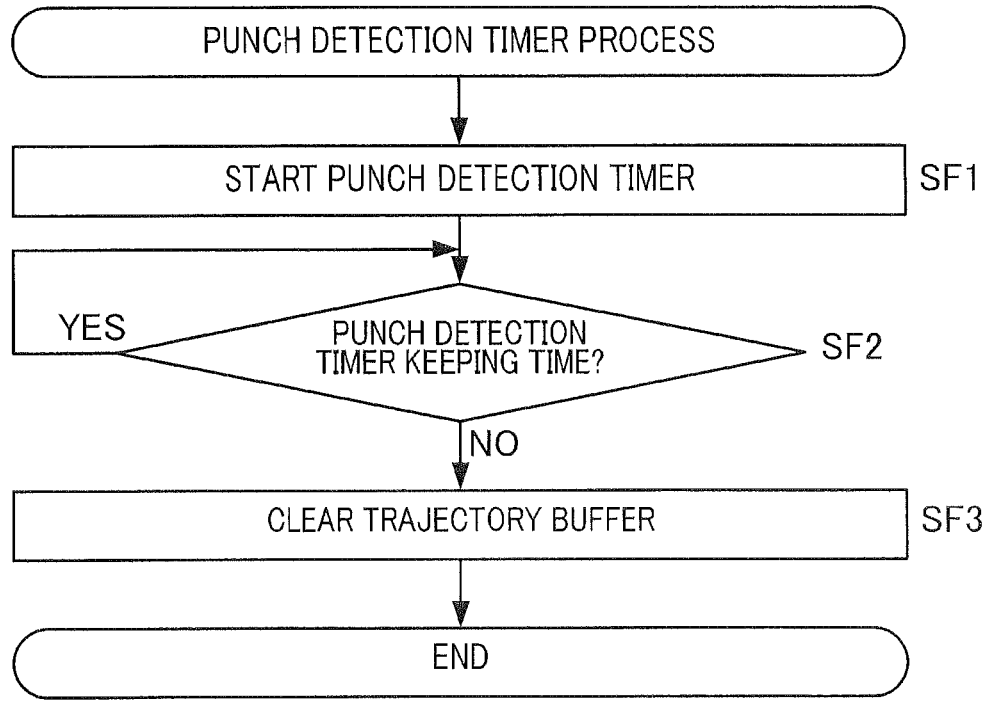
FIG. 17 is a flowchart showing a procedure of a time keeping process for punch detection of game apparatus 1.

FIG. 17 is a flowchart showing a procedure of the punch detection timer process. The punch detection timer process is executed every time, for each operating device 8, acceleration directed toward screen 3 of equal to or greater than the standard value is caused. In the punch detection timer process, processor 16 first causes a punch detection timer corresponding to this punch detection timer process to start (SF1). Processor 16 then determines whether this punch detection timer is keeping time (SF2). In a case in which a result of the determination is YES, the process returns to Step SF2. On the other hand, in a case in which a result of the determination in Step SF2 is NO, processor 16 clears the trajectory buffer corresponding to the punch detection timer process (SF3), to end the punch detection timer process.

Figure 18:
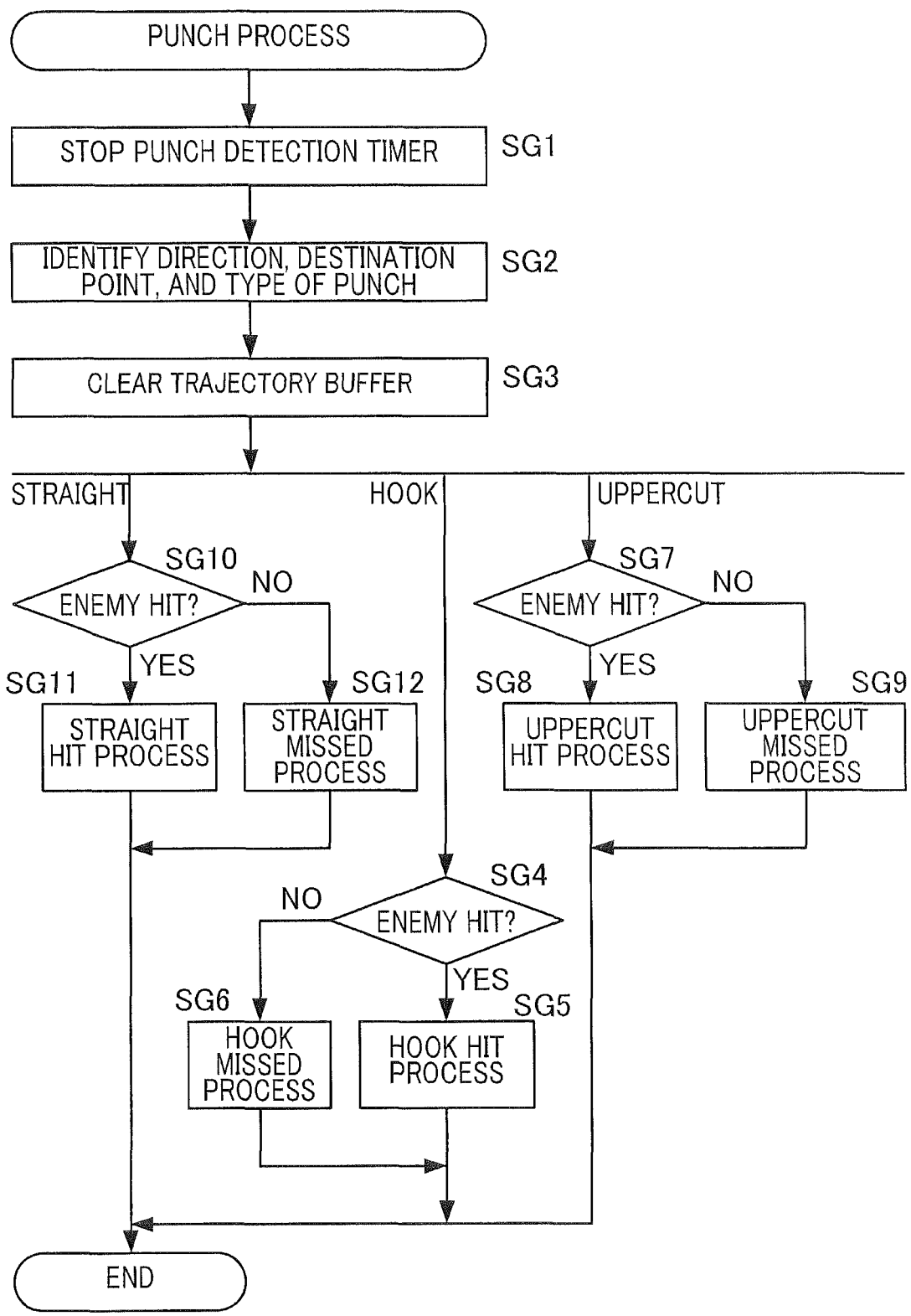
FIG. 18 is a flowchart showing a procedure of a punching process of game apparatus 1.

FIG. 18 is a flowchart showing a procedure of a punch process. The punch process is a process performed when it is determined in Step SD12 of FIG. 15 that a punch was rendered. In the punch process, processor 16 first stops the punch detection timer for the object operating device (SG1). Processor 16 then identifies the direction of a punch, its destination point and type (SG2). Specifically, the processor, by referring to the trajectory buffer corresponding to the object operating device, determines, as the destination point, a point of the position that is the most distant from the punch origin, and determines, as the direction of the punch, the direction of a straight line passing through the destination point and the punch origin. The processor determines that the punch is a "hook" in a case in which the direction is a direction within a first direction range with the punch origin as the base point, and the "uppercut" in a case in which the direction is a direction within a second direction range with the punch origin as the base point, and a "straight" in a case in which the direction falls neither in the first nor the second direction range. The first and the second direction ranges are determined in advance.

Thus, processor 16 serves as a type identifier that identifies a type of a hitting motion from the position history from the origin and thereafter in a case in which it was determined by the motion determiner that the hitting motion was performed. More specifically, processor 16 serves as a type identifier that determines, as the destination point, a position that is the most distant from the origin and determines, as the direction of the hitting motion, the direction of a straight line passing through the destination point and the origin, to identify a type of the hitting motion based on the direction and the predetermined direction range. Also, processor 16 serves as a direction calculator that calculates the direction of a straight line passing through the origin and the second position in a case in which it was determined by the motion determiner that the hitting motion was performed.

Processor 16 then clears the trajectory buffer corresponding to the object operating device (SG3). The subsequent process varies depending on a type of punch identified. In a case in which the identified type of punch is a hook, processor 16 determines whether this hook hits the enemy character (SG4). Specifically, the processor determines whether the trajectory of a fist defined based on the direction, the destination point, and the type identified in Step SG2 intersects with an enemy character in the imaginary space. In a case in which a result of the determination is YES, processor 16 performs a hook hit process (SG5).

Specifically, the processor identifies an enemy character who was hit by the hook (enemy character E1 in FIG. 4) and a portion hit by the hook, to perform a process of reducing the remaining power of the enemy character by setting damage to the enemy character depending on the identified result, and to perform a production process depending on the identified result by using display unit 12 and sound emitter 13. For example, in the example of FIG. 4, the sound effect indicating that the punch has hit the target is emitted from speakers 4,4, and an image showing the fist FAR of the right hook traveling in the imaginary space to hit enemy character E1 and enemy character E1 losing a balance with damage is displayed. On the other hand, in a case in which a result of the determination in Step SG4 is NO, processor 16 performs a hook missed process (SG6). Specifically, an image showing the fist FAR of the right hook traveling in the imaginary space is displayed on display unit 12. In a case in which the process of Step SG5 or SG6 ends, the punch process ends.

In a case in which the identified type of punch is an uppercut, processor 16 determines whether this uppercut hits an enemy character (SG7). In a case in which a result of the determination is YES, processor 16 performs an uppercut hit process (SG8). Specifically, the processor identifies an enemy character who was hit by the uppercut (enemy character E1 in FIG. 5) and a portion hit by the uppercut, to perform a process of reducing the remaining power of the enemy character by setting damage to the enemy character depending on the identified result, and to perform a production process depending on the identified result by using display unit 12 and sound emitter 13. For example, in the example of FIG. 5, the effect sound indicating that the punch has hit the target is emitted from speakers 4,4, and an image showing the fist FAL of the left uppercut traveling in the imaginary space to hit enemy character E1 and enemy character E1 losing a balance with damage is displayed. On the other hand, in a case in which a result of the determination in Step SG7 is NO, processor 16 performs an uppercut missed process (SG9). Specifically, an image showing the fist FAL of the left uppercut traveling in the imaginary space is displayed on display unit 12. In a case in which the process of Step SG8 or SG9 ends, the punch process ends.

In a case in which the type of punch identified is a straight, processor 16 performs the process of Steps SG10 and SG11, or Steps SG10 and SG12. Description of these processes is omitted because it is obvious from the above description on the hook and the uppercut.

Figure 19:
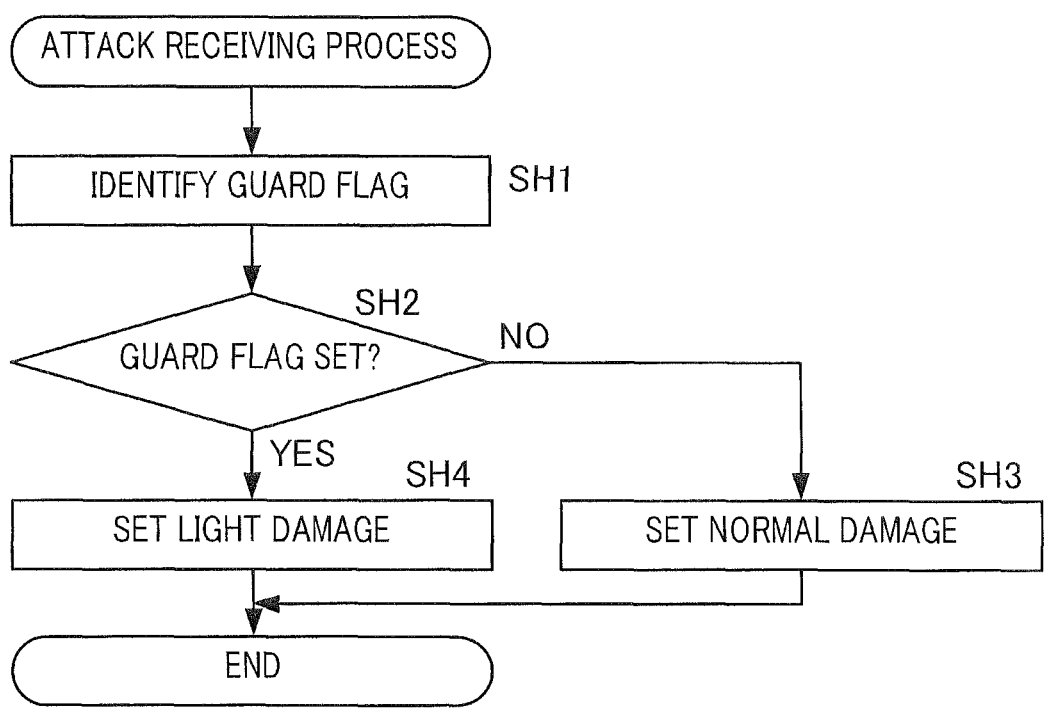
FIG. 19 is a flowchart showing a procedure of an attack receiving process of game apparatus 1.

FIG. 19 is a diagram showing a procedure of the attack receiving process. The attack receiving process is performed when an attack from an enemy character has hit a player character. In the attack receiving process, processor 16 identifies a guard flag corresponding to a character which was hit and a type of the attack which has hit the character (SH1). For example, if the attack which has hit the character is a punch to the left body of Player A's character, the guard flag corresponding to operating device 8AL is identified.

Processor 16 determines whether the identified guard flag is set (SH2). In a case in which a result of the determination is NO, i.e., no effective guard is performed, processor 16 sets normal damage to the character which was hit and reduces the remaining power of the character (SH3). On the other hand, in a case in which a result of the determination in Step SH2 is YES, i.e., in a case in which the effective guard is performed, processor 16 sets light damage to the character which was hit and reduces the remaining power of the character (SH4). The normal damage is damage a character receives when the effective guard is not performed, and the light damage is damage a character receives when the effective guard is performed, with the light damage being lighter than the normal damage. Therefore, the amount reduced from the remaining power is small in a case in which the light damage is set, and is large in a case in which the normal damage is set. When the process of Step SH3 or SH4 ends, the attack receiving process ends.

As is obvious from the foregoing description, game apparatus 1 is understood as a game apparatus that has a motion determination apparatus (not shown) which determines whether the hitting motion has been performed, display unit 12 connected to the fixed main unit 100, and a game executor (processor 16) being provided at main unit 100 and capable of advancing the specific game by using display unit 12. The game executor executes a predetermined instruction (various hit processes and various missed processes) when it is determined by the motion determiner that a hitting motion has been performed. The motion determination apparatus has main unit 100 and movable operating device 8 held by a player and is capable of detecting the body motion of the player and of transmitting a signal to, and receiving from, main unit 100. Operating device 8 has acceleration sensor 86 for detecting acceleration, light source 85 for emitting light, and transmitter 87 that transmits the value detected by acceleration sensor 86 to main unit 100, and main unit 100 has light receiving units 9L and 9R that are attached to two positions, receives light emitted from light source 85 of operating device 8, and detects the intensity of the received light, a position detector (processor 16) that performs a process of detecting the position of operating device 8 based on the intensity of light detected by each of light receiving units 9L and 9R, a RAM 14 for storing the position history of operating device 8 detected by the position detector, and a motion determiner (processor 16) that determines whether a player has performed a hitting motion from the position history of operating device 8 and the detected values of acceleration sensor 86. Therefore, game apparatus 1 is an apparatus that, in a case in which a player performs a predetermined motion, should perform a process corresponding to the motion, and is capable of determining whether a player has performed a hitting motion and performing a process corresponding to the hitting motion based on the determination result. It is to be noted that, in this example, a hitting motion is determined by processor 16, but a predetermined motion may be determined.

Furthermore, acceleration that is caused when a predetermined motion is performed and information (for example, moving distance) obtained from the positions of operating device 8 may be stored in ROM 15 as motion patterns, so that processor 16 compares the motion patterns with the actually detected acceleration and information that can be obtained from the positions, to determine whether the predetermined motion has been performed. In this way, it becomes possible to distinguish, for example, a motion that swings operating device 8 quickly and with a little swing (large acceleration and small moving distance) and a motion that swings operating device 8 slowly and with a large swing (small acceleration and large moving distance).

Furthermore, when acceleration of equal to or greater than the predetermined standard value is detected by the acceleration sensor, processor 16 may be triggered by this detection, to determine whether a player has performed a predetermined motion by referring to the position history stored in RAM 14. In this mode, because the processor performs the motion determination only when a player moves operating device 8 with acceleration that is equal to or greater than the standard value, the motion determination does not have to always be performed. Therefore, the processing burden can be reduced. In addition, that a player's arm has been moved with acceleration of equal to or greater than the standard value can be used as one of conditions of a predetermined motion. A player's arm slightly moves even if the player is conscious of keeping the arm from moving. In a case in which a certain instruction is input depending on a predetermined motion, a subtle motion needs be eliminated since it does not reflect the player's intent. In this mode, because the detection of acceleration of equal to or greater than the standard value can be made one of the conditions for a predetermined motion, an instruction can be input accurately.

Also, as described above, game apparatus 1 is understood as a game apparatus that has an image processing apparatus (not shown) that displays, at a position designated by a player, an image indicating that it is the designated position and a game executor (processor 16) provided on the fixed main unit 100 and capable of advancing the specific game using display unit 12. The image processing apparatus has main unit 100 and light source 85 for emitting light, movable operating device 8 held by a player, and screen 3, and is provided with the fixed display unit 12. Main unit 100 has light receivers located at at least two places, the light receivers receiving a light emitted from light source 85 of operating device 8 and detecting the intensity of the received light, light receiving units 9L and 9R, a position detector (processor 16) that repeatedly performs a process of detecting the position of operating device 8 based on the intensity of light detected by each of light receiving units 9L and 9R, an intersection point position calculator (processor 16) that calculates an intersection point position on screen 3 where a straight line passing through a position of operating device 8 detected by the position detector and the predetermined standard position intersects with screen 3, and a display controller (processor 16) that controls display unit 12 so that an image indicating an intersection point is displayed at the intersection point position of screen 3. Operating device 8 detects a body motion of a player and is also capable of transmitting a signal to, receiving from, main unit 100, and the game executor advances the specific game based on the intersection point position on screen 3 and a signal from operating device 8. Therefore, game apparatus 1 is an apparatus at which a player moves operating device 8 to designate a position on screen 3, and is capable of displaying an image indicating the designated position (intersection point) with accuracy independent of acceleration exerted on operating device 8 and at sufficiently short time intervals, without causing the player to feel visually bothered.

3. Modification

The present invention is not limited to the above-described embodiment, and can include modifications listed in the following.

In the above embodiment, a player is allowed to select whether the player uses a gun or not, but this may be modified. For example, the specific game may be a computer game having plural stage configurations, so that in one stage, the use of a gun is prohibited, and in another stage the use of a punch is prohibited. Alternatively, the specific game may be a computer game in which only the use of a punch is allowed in a play, or a computer game in which in which only the use of a gun is allowed in a play, or both games may be allowed in a single game apparatus.

In the above embodiment, one character can use two guns, but it may be modified so that one character can use only one gun. Also, a player may operate the character to pick up a gun positioned in the imaginary space, so that the character can be caused to use the gun. Furthermore, in the above embodiment, operating device 8 is provided with acceleration sensor 86, but this may be modified in such a way that an operating device is not provided with an acceleration sensor.

In the above embodiment, a type of a punch is identified based on the direction of a straight line passing through the punch origin and immediately previous coordinates of the latest coordinates, a first direction range, and a second direction range, but this may be modified so that a type of a punch may be identified using a pattern matching. Specifically, by preparing patterns of the sequence of the coordinates for each type of punch, a type of a pattern that is similar to the sequence of the coordinates in the trajectory buffer may be identified as a type of a punch.

In the above-described embodiment, the number of operating devices 8 is 4, but this may be modified in such a way that the number thereof is a number between 1 and 3, inclusive, or equal to or greater than 5. Needless to say, in a case in which the number of operating devices 8 is 1, a single-play type game is inevitably intended. Furthermore, in the above embodiment, a player grasps an operating device, but this may be modified in such a way that the operating device is formed in a glove-shape to be worn on a player's hand. Basically, an operating device should move with a player's hand.

Furthermore, in the above embodiment, the number of light receiving units is 2, but this may be modified in such a way that the number thereof is equal to or greater than 3. In a case in which the number is equal to or greater than 3, the number of infrared sensors for each light receiving unit can be equal to or less than 2. Also, in the above embodiment, an infrared light is used for position detection, but this is not limited thereto. In the above embodiment, a game in which two players cooperate with each other is intended, but this is not limited thereto. Also, in the above embodiment, a game in which a player's character is not displayed is intended, but this is not limited thereto.

In the above embodiment, the number of types of punch is 3, but this may be modified in such a way that the number is equal to or less than 2 or equal to greater than 4. In a case in which the number is equal to or less than 2, the first direction range or the second direction range will no longer be required; and in a case in which the number is equal to greater than 4, another direction range will be required. Furthermore, in the above embodiment, the time-division control is used to cause plural operating devices 8 to emit light exclusively, but this may be modified so that another technique such as the frequency-multiplex control may be used.

In the above embodiment, an operating device is grasped by a player's hand, but this may be modified in such a way that an operating device is worn on a player's hand. Also, in the above embodiment, a hitting motion is an object of determination by the motion determiner, but this may be modified in such a way that a player's extension and retraction motion (for example, kicking motion) or a player's bending and stretching motion other than a hitting motion, or a predetermined motion not limited to extension and retraction motions or bending and stretching motions may be an object for determination by the motion determiner. In a case in which the kicking motion is an object for determination by the motion determiner, an operating device will be worn on a player's leg, and in a case in which the bending and stretching motion is an object for determination by the motion determiner, an operating device will be worn on a player's upper torso other than hands.

In the above embodiment, in a case in which it is determined by the motion determiner that a player's extension and retraction motion was performed, a game apparatus is provided with a type identifier that identifies a type of a player's extension and retraction motion from the position history of the operating device, but this may be modified in such a way that the game apparatus does not have the type identifier. In the above embodiment, the type identifier regards, as the destination point, a position that is the most distant from the origin, and, given that the direction of a straight line passing through the destination point and the origin is the direction of the extension and retraction motion, the type identifier identifies a type of a player's extension and retraction motion based on this direction and a predetermined direction range, but the present invention is not limited thereto.

Also, in the above embodiment, the motion determiner regards, as the origin, a point of a position detected by the position detector immediately before acceleration of equal to or greater than a predetermined standard value is detected by the acceleration sensor, regards, as a determination distance, a distance between the origin and a position detected by the position detector after the origin was detected, and determines whether a player's extension and retraction motion was performed based on the relationship between a first determination distance with respect to a first position detected by the position detector at a certain time point and a second determination distance with respect to a second position detected by the position detector immediately previous to the detection of the first position, but the present invention is not limited thereto. Also, in the present embodiment, the motion determiner determines that a hitting motion has been performed when the first determination position with respect to the first position is smaller than the second determination distance with respect to the second position and when the second determination distance with respect to the second position is equal to or greater than a predetermined standard distance, but the present invention is not limited thereto.

Furthermore, in the above embodiment, the frequency of light emitted by the light emitting unit is a frequency that does not interfere with an external light, but when the external light is sufficiently weak, this may be modified to a frequency that interferes with an external light. Furthermore, in the above embodiment, the position detector repeatedly and at regular time interval performs a process of detecting a position of an operating device based on the intensity of lights detected by each of plural light receiving units, but this process may be repeated by the position detector at time interval that is not regular.

In the above-described embodiment, the main unit is provided with an in-or-off-screen determiner that determines whether the straight line intersects with the screen and a storage controller that causes the storage device to store a result of the determination by the in-or-off-screen determiner, and the motion determiner, in a case in which a result of the determination stored in the storage device is negative, determines that a player did not perform a predetermined motion, but this may be modified in such a way that the main unit is not provided with the in-or-off-screen determiner or the storage controller, and that the motion determiner does not perform the determination.

Furthermore, in the above embodiment, the specific game is intended, but a computer game other than the specific game may be intended. For example, a computer game other than a shooting game in which a player shoots an object displayed on a screen with a shooting device may be intended, with an image indicating an intersection point being an image that differs from an image showing a position at which a shooting device aims.

Furthermore, in the above embodiment, the motion determination apparatus and the image processing apparatus are used for the implementation of a computer game, but the use of the motion determination apparatus and the image processing apparatus are not limited thereto. For example, the motion determination apparatus and the image processing apparatus may be used for the implementation of a simulation for inputting an instruction by a person (for example, a simulation for structural analysis). Also, in this case, a person who holds an operating device at the motion determination apparatus and the image processing apparatus will not be a player but an operator, the game executor will no longer be required, and, the display unit will not be required depending on the details of the simulation. No matter whether an apparatus is a game apparatus for a computer game or an apparatus for performing simulation, as long as the apparatus is provided with the motion determination apparatus or the image processing apparatus, the apparatus is a type of the motion determination apparatus or the image processing apparatus. Therefore, various modifications described above in relation to the game apparatus may be applied to the motion determination apparatus and the image processing apparatus. It is to be noted that a freely-selected combination of the above various modifications is also possible, and the present invention includes embodiments according to these modifications.

What is claimed is:

1. A game apparatus comprising:
a motion determination apparatus;
a display unit connected to a main unit; and
a game executor that is provided with the main unit and configured to conduct a game by using the display unit, the motion determination apparatus comprising:
a fixed main unit; and
a movable operating device, held by an operator, that detects body motions of the operator and for transmitting signals to, and receiving from, the main unit, the operating device comprising:
an acceleration sensor that detects acceleration;
a light emitter that emits light; and
a transmitter that transmits a value detected by the acceleration sensor to the main unit, and
the main unit comprising:
light receivers arranged at least at two positions, each receiving light emitted from the light emitter and detecting an intensity of the received light;
a position detector configured to detect a position of the operating device based on the intensity of the received light detected by each of the light receivers;
a storage device configured to store history of each position of the operating device detected by the position detector; and
a motion determiner configured to determine whether the operator has performed a predetermined motion on the basis of the history of the positions of the operating device and the detected value of the acceleration sensor, wherein the game executor is further configured to execute a predetermined instruction in a case in which it is determined by the motion determiner that a predetermined motion has been performed, wherein the motion determiner is further configured to determine whether an extension and retraction motion of the operator has been performed based on the relationship between a first determination distance of a first position detected by the position detector and a second determination distance of a second position previously detected immediately before the detection of the first position detected by the position detector, the first and the second determination distances being a distance between an origin and a position detected by the position detector after the origin was detected, with the origin being a point of a position detected by the position detector immediately before acceleration of equal to or greater than a predetermined standard value is detected by the acceleration sensor.

2. A game apparatus according to claim 1, further comprising:

a type identifier that, in a case in which it is determined that an extension and retraction motion of the operator has been performed, identifies a type of the extension and retraction motion of the operator based on the history of each position of the operating device.

3. A game apparatus according to claim 2, wherein the type identifier identifies the type of the extension and retraction motion of the operator based on a direction of the extension and retraction motion and a predetermined range of the direction, the direction being assumed as corresponding to a direction of a straight line passing through a destination point and the origin, with the destination point being the position that is the most distant from the origin.

4. A game apparatus according to claim 1, wherein the motion determination apparatus further comprises a direction calculator that calculates a direction of a straight line passing through the origin and the second position in a case in which the motion determiner determines that an extension and retraction motion of the operator has been performed.

5. A game apparatus according to claim 1, wherein the motion determination apparatus has a plurality of the operating devices, and wherein the light emitter of each of the operating devices emits light during a period in which the light emitter of any other operating device of the operating devices is not emitting light.

6. A game apparatus according to claim 1, wherein the frequency of light emitted by the light emitter is set to a frequency that does not interfere with external light.

7. A game apparatus according to claim 1, wherein the operating device is held by or is worn on a hand of the operator, and the motion determiner is further configured to determine that the extension and retraction motion is a hitting motion.

8. A game apparatus according to claim 1, wherein the operating device is attached to a leg of the operator, and the motion determiner is further configured to determine that the extension and retraction motion is a kicking motion.

9. A game apparatus according to claim 1, wherein the operating device is attached to the upper torso of the operator other than the hands, and the motion determiner is further configured to determine that the extension and retraction motion is a bending and stretching motion.

10. A game apparatus comprising:

a motion determination apparatus;

a display unit connected to the main unit; and a game executor that is provided with the main unit and is configured to conduct a game by using the display unit, the motion determination apparatus comprising:

a fixed main unit; and a movable operating device, held by an operator, that detects body motions of the operator and for transmitting signals to, and receiving from, the main unit, the operating device comprising:

an acceleration sensor that detects acceleration;

a light emitter that emits light; and a transmitter that transmits a value detected by the acceleration sensor to the main unit, and the main unit comprising:

light receivers arranged at least at two positions, each receiving light emitted from the light emitter and detecting an intensity of the received light;

a position detector configured to detect a position of the operating device based on the intensity of the received light detected by each of the light receivers;

a storage device configured to store history of each position of the operating device detected by the position detector; and at least one memory operable to store program code;

at least one processor operable to access said memory and read said program code and operate as instructed by said program code, said program code including:

a motion code that configured to cause at least one of said at least one processor to determine whether the operator has performed a predetermined motion on the basis of the history of the positions of the operating device and the detected value of the acceleration sensor, wherein the game executor is further configured to execute a predetermined instruction in a case in which it is determined by the motion code that a predetermined motion has been performed, wherein the motion code is further configured to cause at least one of said at least one processor to determine whether an extension and retraction motion of the operator has been performed based on the relationship between a first determination distance of a first position detected by the position detector and a second determination distance of a second position previously detected immediately before the detection of the first position detected by the position detector, the first and the second determination distances being a distance between an origin and a position detected by the position detector after the origin was detected, with the origin being a point of a position detected by the position detector immediately before acceleration of equal to or greater than a predetermined standard value is detected by the acceleration sensor.

* * * * *